(12) United States Patent
Ishikawa et al.

(10) Patent No.: US 12,158,169 B2
(45) Date of Patent: Dec. 3, 2024

(54) CLAMPING DEVICE

(71) Applicants:NT TOOL CORPORATION, Takahama (JP); DMG MORI CO., LTD., Yamatokoriyama (JP)

(72) Inventors: Hitoshi Ishikawa, Takahama (JP); Yusuke Moriya, Nagoya (JP)

(73) Assignees: NT TOOL CORPORATION, Takahama (JP); DMG MORI CO., LTD., Yamatokoriyama (JP)

( * ) Notice: Subject to any disclaimer, the term of this patent is extended or adjusted under 35 U.S.C. 154(b) by 0 days.

(21) Appl. No.: 18/283,545

(22) PCT Filed: Feb. 7, 2022

(86) PCT No.: PCT/JP2022/004751
§ 371 (c)(1),
(2) Date: Sep. 22, 2023

(87) PCT Pub. No.: WO2022/201920
PCT Pub. Date: Sep. 29, 2022

(65) Prior Publication Data
US 2024/0159259 A1 May 16, 2024

(30) Foreign Application Priority Data
Mar. 24, 2021 (JP) .................... 2021-050807

(51) Int. Cl.
*F16B 1/00* (2006.01)
*F16B 1/04* (2006.01)
(Continued)

(52) U.S. Cl.
CPC ............. *F16B 1/04* (2013.01); *F16B 4/002* (2013.01); *F16B 21/125* (2013.01); *F16B 21/16* (2013.01); *F16B 2200/406* (2018.08)

(58) Field of Classification Search
CPC .......... F16B 1/04; F16B 4/002; F16B 21/125; F16B 21/16; F16B 2200/406; F16B 7/1418; F16B 2200/403
See application file for complete search history.

(56) References Cited

U.S. PATENT DOCUMENTS 4,438,901 A * 3/1984 Reneau .................. B25B 29/02
81/57.38
4,856,153 A * 8/1989 Gusching .............. B23B 31/261
29/27 A
(Continued)

FOREIGN PATENT DOCUMENTS

DE 3726305 A1 2/1989
EP 1027947 A2 8/2000
(Continued)

OTHER PUBLICATIONS

English translation of the Written Opinion of the International Searching Authority for parent application No. PCT/JP2022/004751.
(Continued)

*Primary Examiner* — Zakaria Elahmadi
(74) *Attorney, Agent, or Firm* — J-TEK LAW PLLC; Jeffrey D. Tekanic; Scott T. Wakeman

(57) ABSTRACT

A clamping device (100) includes a first movable member (210) that is movable along an extending direction of a first body interior space (120), a disc spring (260), an annular spring (270), a spring (280) and a collet (300). A driving mechanism (400) has a second movable member (430) that moves along an extending direction of a second body interior space (130) with rotation of a rotary member (410). When the rotary member is rotated in one direction, the first movable member moves toward an oil-filled closed space (121) and the clamping device is set to a clamping mode that will hold a tool holder (510). On the other hand, when the
(Continued)

rotary member is rotated in the opposite direction, the first movable member moves towards the side opposite of the oil-filled closed space and the clamping device is set to an unclamping mode that will release the tool holder.

20 Claims, 16 Drawing Sheets

(51) Int. Cl.
  *F16B 4/00*  (2006.01)
  *F16B 21/12*  (2006.01)
  *F16B 21/16*  (2006.01)

(56) References Cited

U.S. PATENT DOCUMENTS

| | | | | |
|---|---|---|---|---|
| 5,405,220 | A * | 4/1995 | Ishikawa | B23B 31/208 |
| | | | | 279/20 |
| 2005/0008448 | A1 * | 1/2005 | Doubler | F16B 37/0864 |
| | | | | 411/353 |
| 2007/0025813 | A1 * | 2/2007 | Doubler | F16B 39/023 |
| | | | | 403/362 |
| 2009/0279964 | A1 * | 11/2009 | Hyatt | B23B 31/202 |
| | | | | 408/239 R |
| 2013/0093236 | A1 * | 4/2013 | Marshall | F16B 13/0858 |
| | | | | 403/345 |
| 2016/0067840 | A1 * | 3/2016 | Fujimoto | B23Q 3/15713 |
| | | | | 483/58 |
| 2016/0229012 | A1 * | 8/2016 | Fujimoto | B23B 31/008 |
| 2017/0225237 | A1 * | 8/2017 | Mihailovic | B23B 31/261 |

FOREIGN PATENT DOCUMENTS

| | | |
|---|---|---|
| JP | S5966550 U | 5/1984 |
| JP | S62282808 A | 12/1987 |
| JP | H0623610 A | 2/1994 |
| JP | 2010131724 A | 6/2010 |
| JP | 2016144853 A | 8/2016 |
| JP | 2020172000 A | 10/2020 |
| WO | 2016207218 A1 | 12/2016 |
| WO | 2018220771 A1 | 12/2018 |

OTHER PUBLICATIONS

English translation of the International Search Report mailed Sep. 29, 2022, for parent application No. PCT/JP2022/004751.
Communication from the European Patent Office dispatched Sep. 5, 2024, in counterpart EP application No. 22774721.1, including Search Opinion, Supplementary European Search Report, and examined claims 1-8.

* cited by examiner

CLAMPING DEVICE

CROSS-REFERENCE

This application is the US national stage of International patent application no. PCT/JP2022/004751 filed on Feb. 2, 2022, which claims priority to Japanese patent application no. 2021-050807 filed on Mar. 24, 2021.

TECHNICAL FIELD

The present invention relates to a clamping device that clamps a member to be clamped, such as a tool or a tool holder that holds the tool.

BACKGROUND ART

In machine tools that machine a workpiece using a tool, a clamping device is used to clamp a member to be clamped such as the tool or a tool holder that holds the tool. For example, a clamping device that clamps a member to be clamped or unclamps the member by utilizing rotation of a motor as disclosed in Patent Document 1 can be used. Specifically, such a clamping device transmits the rotational power of the motor to the clamping mechanism via a speed reducing mechanism and a motion converting mechanism that converts rotational motion into linear motion.

PRIOR ART DOCUMENT

Patent Document

Patent Document 1: Japanese Unexamined Patent Application Publication No. 2016-144853

SUMMARY OF THE INVENTION

Because the clamping device disclosed in Patent Document 1 uses a speed reducing mechanism and a motion converting mechanism that require gears, the configuration is complicated and expensive.

It is therefore an object of the present teachings to disclose techniques that, e.g., reduce the complexity and/or cost of such a clamping device.

Thus, in one aspect of the present teachings, a member to be clamped by using a clamping device of the present teachings has a shank part and the shank part is formed with a recess.

Such a clamping device has a body, a clamping mechanism and a driving mechanism that drives the clamping mechanism.

The body has a first body interior space, a second body interior space and a communication passage. The body can be formed by connecting a plurality of members (elements, structures) with bolts, etc., or it can be formed as a single member. The extending direction of the first body interior space and the extending direction of the second body interior space can be appropriately set. For example, they can be set to be crossing (including orthogonal) or the same (parallel).

The clamping mechanism has a first movable member, a first chamber, a first elastic member and a collet. The first movable member is movable along the extending direction of the first body interior space. The volume of the first chamber changes in response to movement of the first movable member. The first elastic member generates an elastic force that urges the first movable member to move relative to the body in a first direction that reduces the volume of the first chamber. The collet has a (at least one) first projection that is engageable with the recess of the member to be clamped. Collets of various configurations can be used as the collet.

The collet is settable (shiftable, movable) to a clamping mode (state, position, orientation) in which the first projection is engaged with the recess, or to an unclamping mode (state, position, orientation) in which the engagement between the first projection and the recess is released. The collet is set to the clamping mode by moving the first movable member in the first direction that reduces the volume of the first chamber. Furthermore, the collet is set to the unclamping mode by moving the first movable member is moved in a second direction that increases the volume of the first chamber.

The driving mechanism has a second movable member and a second chamber. The second movable member is movable along an extending direction of the second body interior space. The volume of the second chamber changes in response to movement of the second movable member.

The communication passage is formed to fluidly connect the first chamber with the second chamber. A power transmitting medium is filed in the first chamber, the second chamber and the communication passage. Oil is preferably used as the power transmitting medium.

The cross-sectional area of the first chamber is set (designed, configured) to be larger than the cross-sectional area of the second chamber. Thus the pressing force that causes the first movable member to move in the direction opposite to the first chamber can be increased.

In the present teachings, when the second movable member moves in a third direction that increases the volume of the second chamber, the first movable member moves in the first direction that reduces the volume of the first chamber due to the elastic force of the first elastic member and the collet is thereby set (moved) to the clamping mode.

In addition, when the second movable member moves in a fourth direction that reduces the volume of the second chamber, the first movable member moves in the second direction that increases the volume of the first chamber against the elastic force of the first elastic member and the collet is thereby set (moved) to the unclamping mode.

Various configurations can be used to set (move) the collet to the clamping mode (position, orientation) or the unclamping mode (position, orientation) in conjunction with (in response to) movement of the first movable member.

Thus, in the present teachings, a clamping device that can be easily configured at a low cost is provided.

In another aspect of the present teachings, the driving mechanism includes a rotary member. The second movable member is configured to be movable along the extending direction of the second body interior space in conjunction with rotation of the rotary member. Various methods or configurations can be used to move the second movable member in conjunction with rotation of the rotary member.

Furthermore, it is configured such that, when the rotary member is rotated in one direction, the second movable member moves in the third direction that increases the volume of the second chamber, and when the rotary member is rotated in the other direction, the second movable member moves in the fourth direction that reduces the volume of the second chamber.

In this aspect, for example, when the rotary member is driven by a motor, a pressing force that moves the first movable member in the second direction that increases the volume of the first chamber can be obtained (generated) with a relatively small motor.

In this aspect, the driving mechanism can be easily configured.

In another aspect of the present teachings, the shank part of the member to be clamped has a shank part inner peripheral surface that defines a shank part interior space having an opening at one end. The recess is formed in the shank part inner peripheral surface.

The first movable member includes a first piston and a first shaft member. The first piston defines the volume of the first chamber. The first shaft member is provided (disposed) on a side of the first piston opposite to the first chamber (on the side that increases the volume of the first chamber) and extends along the extending direction of the first body interior space. The first movable member can be formed, for example, by connecting the first piston and the first shaft member that are separately formed from each other with bolts, etc. Or, it can be formed as a single (integral) member having the first piston and the first shaft member.

In addition, the collet includes a plurality of collet members disposed along the circumferential direction on the radially outer side of the first shaft member.

Each of the collet members extends in the circumferential direction and the axial direction. Each of the collet members has a collet member inner peripheral surface and a collet member outer peripheral surface. The first projection of each of the collet members protrudes radially outward from an end part on a side opposite to the first chamber.

Each of the collet member inner peripheral surfaces has, when viewed in cross-section taken along an extending direction of the first shaft member, a first collet member inner peripheral surface portion, and a second collet member inner peripheral surface portion formed on a side of the first collet member inner peripheral surface portion opposite to the first chamber. The second collet member inner peripheral surface portion extends at an inclination angle θ to an extending direction of the first collet member inner peripheral surface portion. The inclination angle θ is set such that the distance between an extension line of the first collet member inner peripheral surface portion and the second collet member inner peripheral surface portion increases from the first chamber side toward the opposite side to the first chamber. For example, the inclination angle θ is set such that the first projection of the collet is engageable with the recess of the member to be clamped in the state in which the first collet member inner peripheral surface portion has been moved close to (including in abutment with) an outer peripheral surface of the first shaft member, and such that the engagement between the first projection and the recess of the member to be clamped is released in the state in which the second collet member inner peripheral surface portion has been moved close to (including in abutment with) the outer peripheral surface of the first shaft member.

In this aspect, it is configured such that, when the first piston moves in the first direction (toward the first chamber) that reduces the volume of the first chamber, the first collet member inner peripheral surface portions of the collet members move toward the first shaft member. Specifically, the second collet member inner peripheral surface portions and the first projections are moved away from the first shaft member. The collet is thereby set (moved) to the clamping mode (position).

In addition it is configured such that, when the first piston moves in the second direction (away from the first chamber) that increases the volume of the first chamber, the second collet member inner peripheral surface portions of the collet members move toward the first shaft member. Specifically, the first projections are moved toward the first shaft member and the first collet member inner peripheral surface portions are moved away from the first shaft member. The collet is thereby set (moved) to the unclamping mode (position).

In this aspect, the collet (or the collet members that form the collet) can be easily set to the clamping mode or the unclamping mode.

In another aspect of the present teachings, the clamping mechanism includes a second elastic member. The second elastic member generates elastic force that moves the first collet member inner peripheral surface portion of each of the collet members toward the first shaft member.

In this aspect, it is configured such that, when the first piston moves in the direction that reduces the volume of the first chamber, the first collet member inner peripheral surface portion of each of the collet members moves toward the first shaft member due to the elastic force of the second elastic member. The collet is thereby set to the clamping mode.

In addition, it is configured such that, when the first piston moves in the direction that increases the volume of the first chamber, the second collet member inner peripheral surface portion of the collet member moves toward the first shaft member against the elastic force of the second elastic member. The collet is thereby set to the unclamping mode.

In this aspect, the collet can be easily set to the clamping mode or the unclamping mode.

In another aspect of this disclosure, each of the collet members has a second projection protruding radially outward at an end part on the first chamber side. The first shaft member has an abutment part configured to be abuttable on the second projection of each of the collet members.

In this aspect, it is configured such that, when the first piston moves in the first direction that reduces the volume of the first chamber, abutment between the abutment part of the first movable member and the second projection of each of the collet members is released. Furthermore, it is configured such that the first collet member inner peripheral surface portions of the collet members move toward the first shaft member due to the elastic force of the second elastic member. The collet is thereby set to the clamping mode.

In addition, it is configured such that, when the first piston moves in the second direction that increases the volume of the first chamber, the abutment part of the first movable member abuts the second projection of each of the collet members and applies a force that moves the second projection radially outward. Furthermore, it is configured such that the second collet member inner peripheral surface portion of each of the collet members moves toward the first shaft member against the elastic force of the second elastic member. The collet is thereby set to the unclamping mode.

In this aspect, the collet can be easily set to the clamping mode or the unclamping mode.

In another aspect of the present teachings, the first shaft member has a projection protruding radially outward at the end part on the side opposite to the first chamber.

In this aspect, it is configured such that, when the first piston moves in the direction that reduces the volume of the first chamber, the projection of the first shaft member abuts on a portion of the second collet member inner peripheral surface portions of the collet members and applies a force that moves the second collet member inner peripheral surface portions away from the first shaft member. The collet is thereby set to the clamping mode.

In addition, it is configured such that, when the first piston moves in the second direction that increases the volume of the first chamber, abutment between the projection of the first shaft member and the portion of the second collet member inner peripheral surface portion of each of the collet members is released. In addition, at this time, it is configured such that the second collet member inner peripheral surface portions of the collet members move toward the first shaft member. The collet is thereby set to the unclamping mode.

In this aspect, the clamping force can be increased, so that engagement between the first projection and the recess of the member to be clamped can be firmly retained.

In another aspect of the present teachings, the body has a movement restricting part at a prescribed position that restricts each of the collet members from moving along the extending direction of the first body interior space in the second direction that increases the volume of the first chamber.

The clamping mechanism has a third elastic member. The third elastic member is configured to generate an elastic force that urges the first movable member and the collet members to move away (separate) from each other.

Each of the collet members is disposed at a prescribed position regardless of movement of the first movable member due to the movement restricting part and the elastic force of the third elastic member.

In this aspect, the collet can be easily set to the clamping mode or the unclamping mode.

In another aspect of the present teachings, the second movable member includes a second piston and a second shaft member. The second piston defines the volume of the second chamber. The second shaft member is provided on a side opposite to the second chamber and extends along the extending direction of the second body interior space. It is configured such that the second shaft member is movable along the extending direction of the second body interior space in conjunction with rotation of the rotary member.

The second movable member can be formed, for example, by connecting the second piston and the second shaft member that are separately formed from each other with bolts, etc. Or, it can be formed as a single (integral) member having the second piston and the second shaft member.

In this aspect, rotation of the rotary member can be converted into movement along the extending direction of the second body interior space with a simple structure.

According to the present teachings, a clamping device that can be easily configured at a low cost can be obtained.

DETAILED DESCRIPTION OF THE INVENTION

The following detailed description is merely intended to teach a person skilled in the art further details for practicing preferred aspects of the present invention. The technical scope of the present invention is not limited by the detailed description, but is determined based on the description of the claims. Combinations of features and steps disclosed within the following detailed description may not be necessary to practice the invention in the broadest sense, and are merely to particularly describe some representative examples of the invention, which detailed description is given with reference to the accompanying drawings.

Representative embodiments of the present teachings are now described with reference to the drawings.

Figure 1:
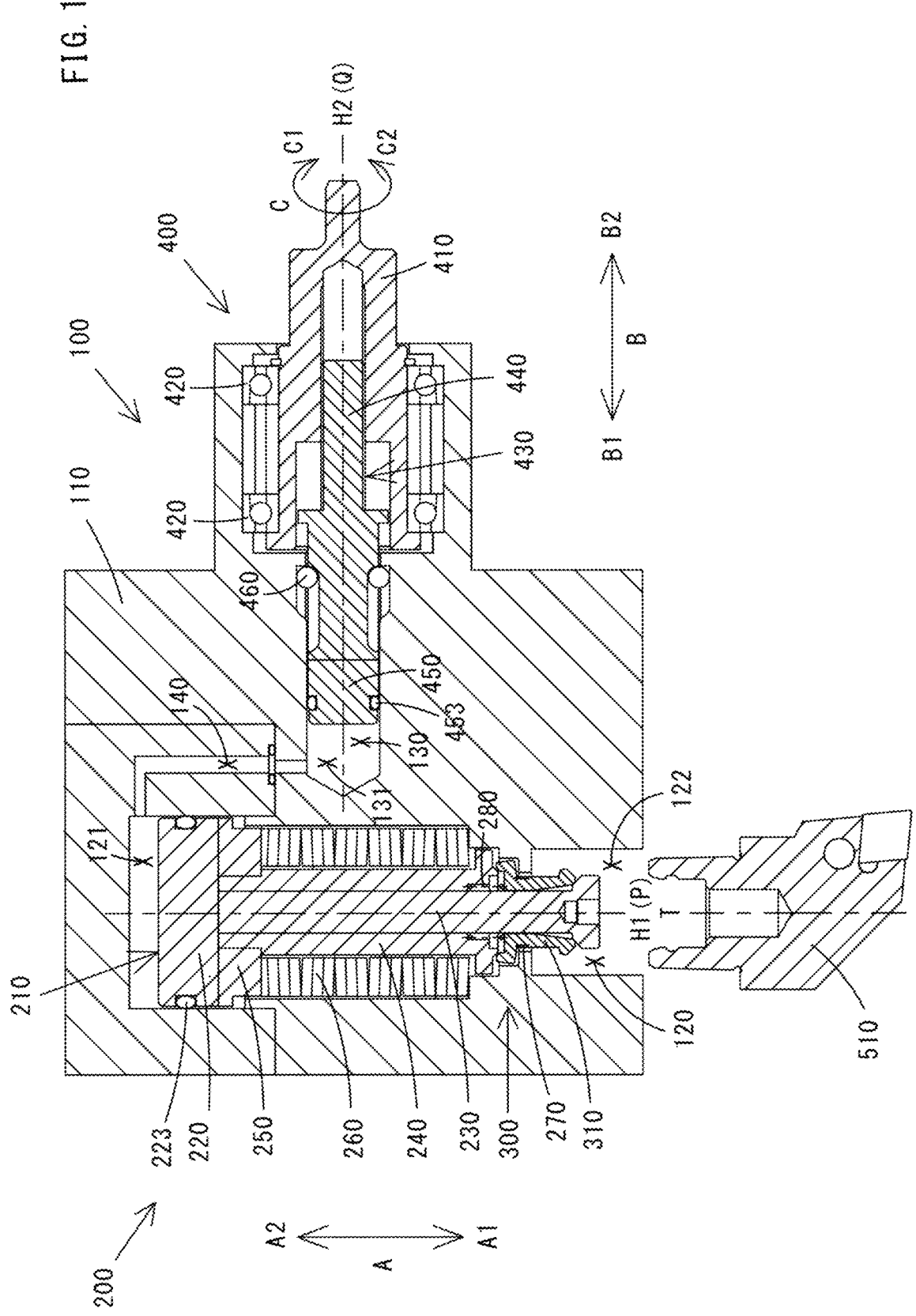
FIG. 1 is a cross-sectional view of a clamping device according to a first embodiment of the present teachings.
Figure 2:
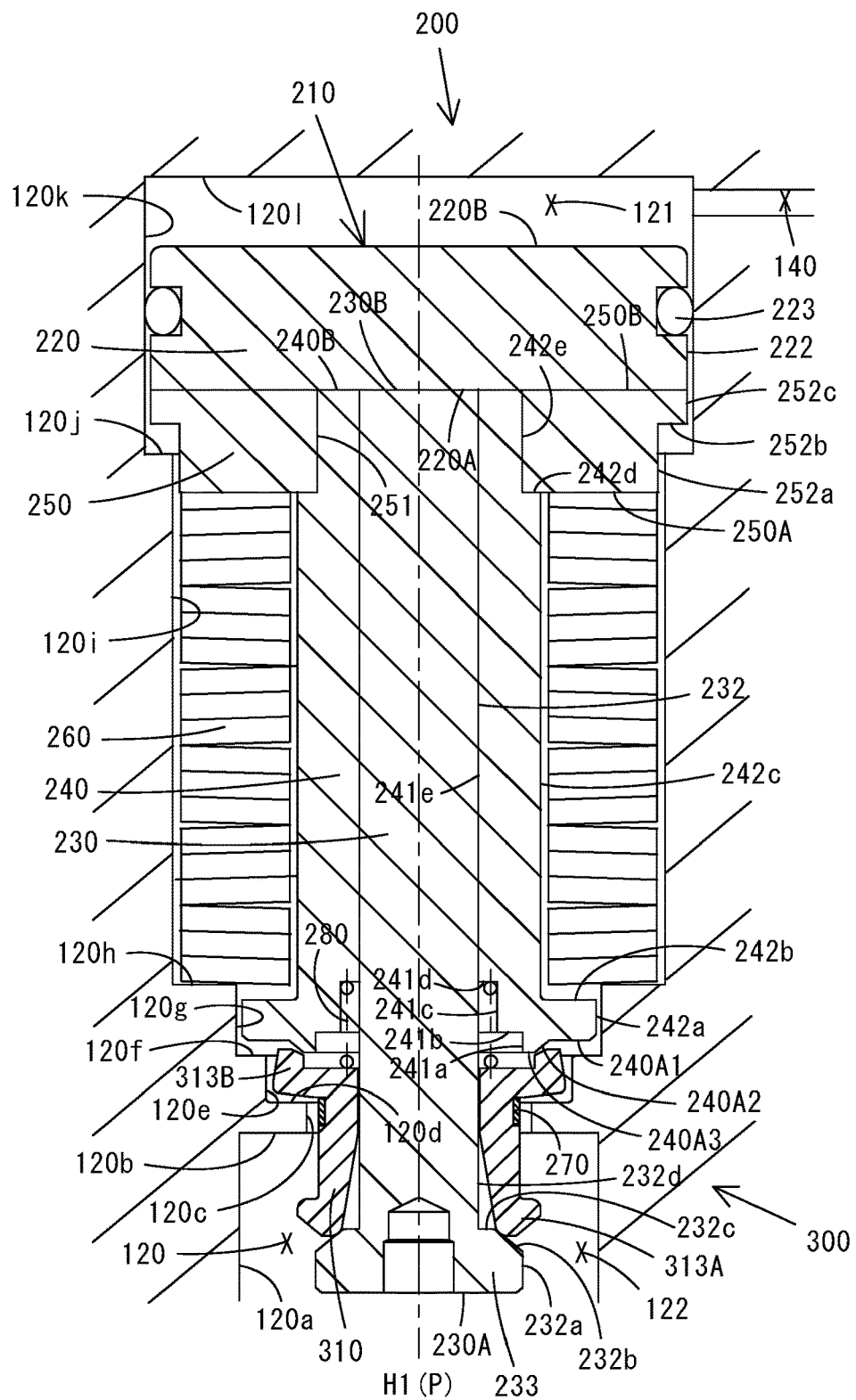
FIG. 2 is a cross-sectional view of a clamping mechanism that forms the clamping device of the first embodiment.
Figure 3:
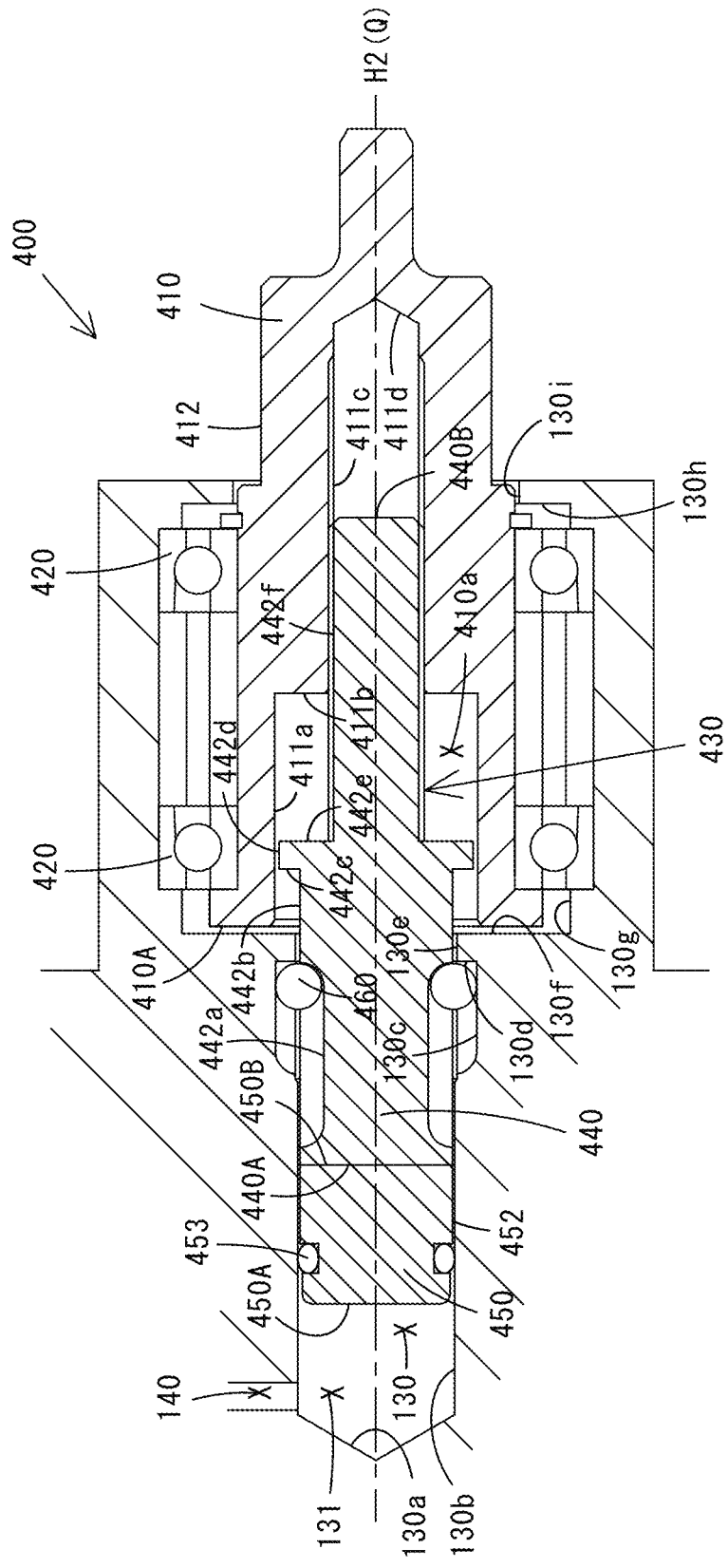
FIG. 3 is a cross-sectional view of a driving mechanism that forms the clamping device of the first embodiment.

A clamping device 100 according to a first embodiment of the present teachings is described with reference to FIGS. 1 to 3. FIG. 1 is a cross-sectional view of the clamping device 100 according to the first embodiment. FIG. 2 is a cross-sectional view of a clamping mechanism 200. FIG. 3 is a cross-sectional view of a driving mechanism 400.

The clamping device 100 of this embodiment is configured as a tool holder clamping device that clamps a tool holder.

An example of a tool holder that is clamped by the clamping device 100 of this embodiment will be described with reference to FIG. 7.

It is noted that, in the following with regard to a tool holder 510, the side (upper side in FIG. 7) along center line T of the tool holder 510 that is inserted into shank part insertion space 122 (described below) of the clamping device 100 is referred to as the "rear end side", and the side (lower side in FIG. 7) opposite to the side that is inserted into the shank part insertion space 122 is referred to as the "front end side".

Figure 7:
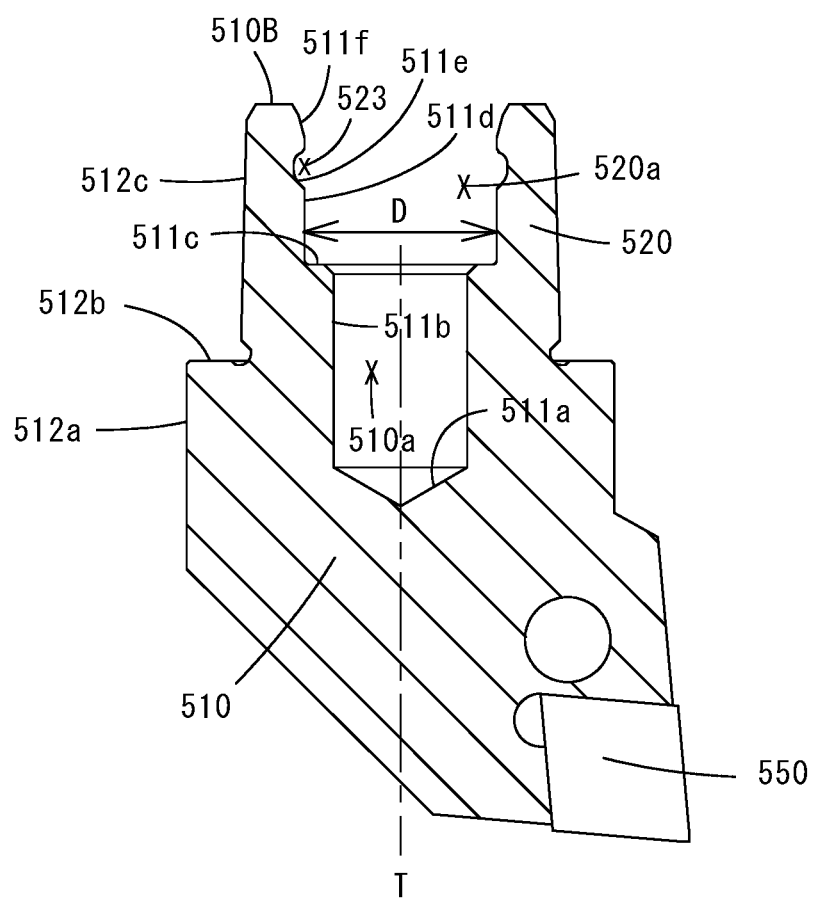
FIG. 7 is a cross-sectional view of an example of a clamped member to be clamped by the clamping device of the first embodiment.

The tool holder 510 shown in FIG. 7 holds a tool 550.

The tool holder 510 has a tool holder rear end surface 510B, a tool holder inner peripheral surface 511 and a tool holder outer peripheral surface 512.

The tool holder inner peripheral surface 511 has tool holder inner peripheral surface portions 511a to 511f. A tool holder interior space 510a having an opening at one end (the rear end) is defined by the tool holder inner peripheral surface 511. The tool holder outer peripheral surface 512 has tool holder outer peripheral surface portions 512a to 512c.

A shank part 520 is provided at a rear end side of the tool holder 510 that is inserted into the shank part insertion space 122 of the clamping device 100. The shank part 520 is defined by the tool holder rear end surface 510B, a shank part inner peripheral surface that includes the tool holder inner peripheral surface portions 511b to 511f, and a shank part outer peripheral surface that includes the tool holder outer peripheral surface portion 512c. The shank part inner peripheral surface and the shank part outer peripheral surface have a circular cross-section. A shank part interior space 520a having an opening at one end (the rear end) is defined by the shank part inner peripheral surface. The shank part inner peripheral surface portion (tool holder inner peripheral surface portion) 511e that forms the shank part inner peripheral surface defines a recess 523 that can be engaged with projections 313A (described below) of the collet members 310 that form the collet 300. The recess 523 is preferably formed as a groove (annular groove) extending in a circumferential direction.

Referring now to FIGS. 1-3, the clamping device 100 of this embodiment comprises a body 110, a clamping mechanism 200 and a driving mechanism 400.

The body 110 has body interior spaces 120 and 130 each having an opening at one end. In this embodiment, the body interior spaces 120 and 130 are formed such that the extending direction of the body interior space 120 (along center line H1) is orthogonal to the extending direction of the body interior space 130 (along center line H2). The extending directions of the body interior spaces 120, 130 can be appropriately selected.

It is noted that the body 110 has a communication passage 140 that fluidly connects a closed space 121 (described below) formed on the side opposite to the opening of the body interior space 120 and a closed space 131 (described below) formed on the side opposite to the opening of the body interior space 130.

The body interior space 120 corresponds to a "first body interior space" of the present teachings, and the body interior space 130 corresponds to a "second body interior space" of the present teachings. The closed space 121 corresponds to a "first chamber" of the present teachings, and the closed space 131 corresponds to a "second chamber" of the present teachings. The communication passage 140 corresponds to a "communication passage" of the present teachings.

As shown in FIG. 2, a body inner peripheral surface that defines the body interior space 120 has body inner peripheral surface portions 120a to 120l.

A projection (annular projection) that protrudes toward the center line H1 (i.e. protrudes radially inward) is defined by the body inner peripheral surface portions 120b to 120d. Each of the collet members 310 (described below), which constitute the collet 300, is disposed on (around) the radially outer side of a shaft member 230 (described below) so as to extend across the projection (120b-120d) along the extending direction of the center line H1. Each of the collet members 310 is restricted (blocked) from moving toward the side (direction) opposite to the closed space 121 along the axial direction (extending direction of the center line H1) by abutting on the body inner peripheral surface portion 120d that defines a portion of the projection.

The body inner peripheral surface portion 120d corresponds to a "movement restricting part at a prescribed position of the body that restricts the collet (each of the collet members) from moving toward the side opposite to the first chamber along the extending direction of the first body interior space" of the present teachings.

The body inner peripheral surface portion 120h is formed as a step surface that extends in a direction crossing (orthogonal to) the extending direction of the center line H1 and connects the body inner peripheral surface portions 120g and 120i.

The body inner peripheral surface portion 120j is formed as a step surface that extends in a direction crossing (orthogonal to) the extending direction of the center line H1 and connects the body inner peripheral surface portions 120i and 120k. The body inner peripheral surface portion 120j serves as a movement restricting part that restricts (blocks) a movable member 210 from moving toward the side (direction) opposite to the closed space 121 along the center line H1.

The body inner peripheral surface portion 120l forms the bottom surface of the body interior space 120.

The shank part insertion space 122 into which the shank part 520 of the tool holder 510 is inserted is defined on the opening side of the body interior space 120 by the body inner peripheral surface portions 120a and 120b.

As shown in FIG. 3, a body inner peripheral surface that defines the body interior space 130 has body inner peripheral surface portions 130a to 130i.

The body inner peripheral surface portion 130f is formed as a step surface that extends in a direction crossing (orthogonal to) the extending direction of the center line H2 and connects the body inner peripheral surface portions 130e and 130g. The body inner peripheral surface portion 130f serves as a movement restricting part that restricts (blocks) a movable member 430 (described below) from moving in the direction toward the closed space 131 along the center line H2.

The body inner peripheral surface portion 130a forms the bottom surface of the body interior space 130.

The clamping mechanism 200 is disposed in the body interior space 120. In this embodiment, the clamping mechanism 200 is arranged such that center line P of the clamping mechanism 200 coincides (including "generally coincides") with the center line H1 of the body interior space 120.

In the following description of the clamping mechanism 200, the opening side (lower side in FIGS. 1 and 2) is referred to as the "front end side" and the side opposite to the opening (upper side in FIGS. 1 and 2) is referred to as the "rear end side", along the extending direction of the body interior space 120 (the center line H1) and the extending direction of the clamping mechanism 200 (the center line P).

The clamping mechanism 200 includes a movable member 210, a disc spring 260, an annular spring 270, a spring 280 and the collet 300.

The movable member 210 is movable along the extending direction of the body interior space 120 (hereinafter referred to as "the extending direction of the center line H1"). The movable member 210 includes a piston 220, a shaft member 230, an actuation member 240 and a pressing member 250. In this embodiment, the movable member 210 is constituted by connecting the piston 220, the shaft member 230, the actuation member 240 and the pressing member 250, which are separately formed from each other, using bolts, etc. However, the movable member 210 can instead be formed as a single member.

The movable member 210 corresponds to a "first movable member" of the present teachings.

The piston 220 has a piston front end surface 220A, a piston rear end surface 220B and a piston outer peripheral surface 222. The piston outer peripheral surface 222 has a circular shaped cross-section.

An O-ring 223 is disposed between the piston outer peripheral surface 222 and the body inner peripheral surface portion 120k. Thus, the closed space 121 is defined by the body inner peripheral surface portions 120k, 120l and the piston 220 (the piston rear end surface 220B). Specifically, the piston 220 defines the variable volume of the closed space 121.

The piston 220 corresponds to a "first piston of the first movable member" of the present teachings.

The shaft member 230 extends along the extending direction of the center line H1, on the front end side (the side opposite to the closed space 121) of the piston 220. In this embodiment, the shaft member 230 has a circular shaped cross-section.

The shaft member 230 has a shaft member front end surface 230A, a shaft member rear end surface 230B and a shaft member outer peripheral surface 232.

The shaft member outer peripheral surface 232 has shaft member outer peripheral surface portions 232a to 232d. A projection 233, which protrudes radially outward, on the front end side of the shaft member 230 is defined by the shaft member front end surface 230A and the shaft member outer peripheral surface portions 232a to 232c. In this embodiment, the shaft member outer peripheral surface portion 232b is formed as a tapered surface inclined such that the distance from the center line H1 increases going from the rear end side toward the front end side.

The shaft member 230 corresponds to a "first shaft member of the first movable member", and the projection 233 corresponds to a "projection of the first shaft member" of the present teachings.

The actuation member 240 is provided on the radially outer side of the shaft member 230 on the front end side of the piston 220 and extends along the center line H1.

The actuation member 240 has a tubular shape and has an actuation member front end surface 240A, an actuation member rear end surface 240B, an actuation member inner peripheral surface 241 and an actuation member outer peripheral surface 242. The actuation member inner peripheral surface 241 and the actuation member outer peripheral surface 242 have a circular cross-section.

The actuation member front end surface 240A has actuation member front end surface portions 240A1 to 240A3. The actuation member front end surface portion 240A2 is formed as a tapered surface inclined such that the distance from the center line H1 (P) increases going from the front end side toward the rear end side. The actuation member front end surface portion 240A2 is abuttable on projections 313B (specifically, collet member inner peripheral surface portions 311e) (described below) of the collet members 310 that constitute the collet 300.

The actuation member inner peripheral surface 241 has actuation member inner peripheral surface portions 241a to 241e. A space into which one end of the spring 280 (described below) is insertable is defined by the actuation member inner peripheral surface portions 241c and 241d.

The actuation member outer peripheral surface 242 has actuation member outer peripheral surface portions 242a to 242e.

The actuation member outer peripheral surface portion 242b is formed as a step surface that extends in a direction crossing (orthogonal to) the extending direction of the center line H1 and connects the actuation member outer peripheral surface portions 242a and 242c.

The actuation member outer peripheral surface portion 242d is formed as a step surface that extends in a direction crossing (orthogonal to) the extending direction of the center line H1 and connects the actuation member outer peripheral surface portions 242c and 242e.

The actuation member 240 corresponds to an "actuation member of the first movable member", and the actuation member front end surface portion 240A2 corresponds to an "abutment part of the first movable member that is abuttable on a second projection of each of the collet members" of the present teachings.

The pressing member 250 is provided on the radially outer side of the actuation member 240 on the front end side of the piston 220.

The pressing member 250 has a tubular shape and has a pressing member front end surface 250A, a pressing member rear end surface 250B, a pressing member inner peripheral surface 251 and a pressing member outer peripheral surface 252.

The pressing member outer peripheral surface 252 has pressing member outer peripheral surface portions 252a to 252c. The pressing member outer peripheral surface portion 252b is formed as a step surface that extends in a direction crossing (orthogonal to) the extending direction of the center line H1 and connects the pressing member outer peripheral surface portions 252a and 252c.

The movable member 210 is restricted (blocked) from moving toward the front end side along the center line H1 by the pressing member outer peripheral surface portion 252b abutting on the body inner peripheral surface portion 120j. Specifically, a movement restricting mechanism that restricts (blocks) movement of the movable member 210 toward the front end side along the center line H1 is constituted by the pressing member outer peripheral surface portion 252b and the body inner peripheral surface portion 120j.

The pressing member 250 corresponds to a "pressing member of the first movable member" of the present teachings.

The disc spring 260 is disposed in a compressed state between the body inner peripheral surface portion 120h and the pressing member front end surface 250A. Thus, the disc spring 260 generates an elastic force that urges the movable member 210 to move along the center line H1 relative to the body 110 toward the rear end side.

The disc spring 260 corresponds to a "first elastic member that generates an elastic force that urges the first movable member to move relative to the body toward a first chamber" of the present teachings.

Figure 4:
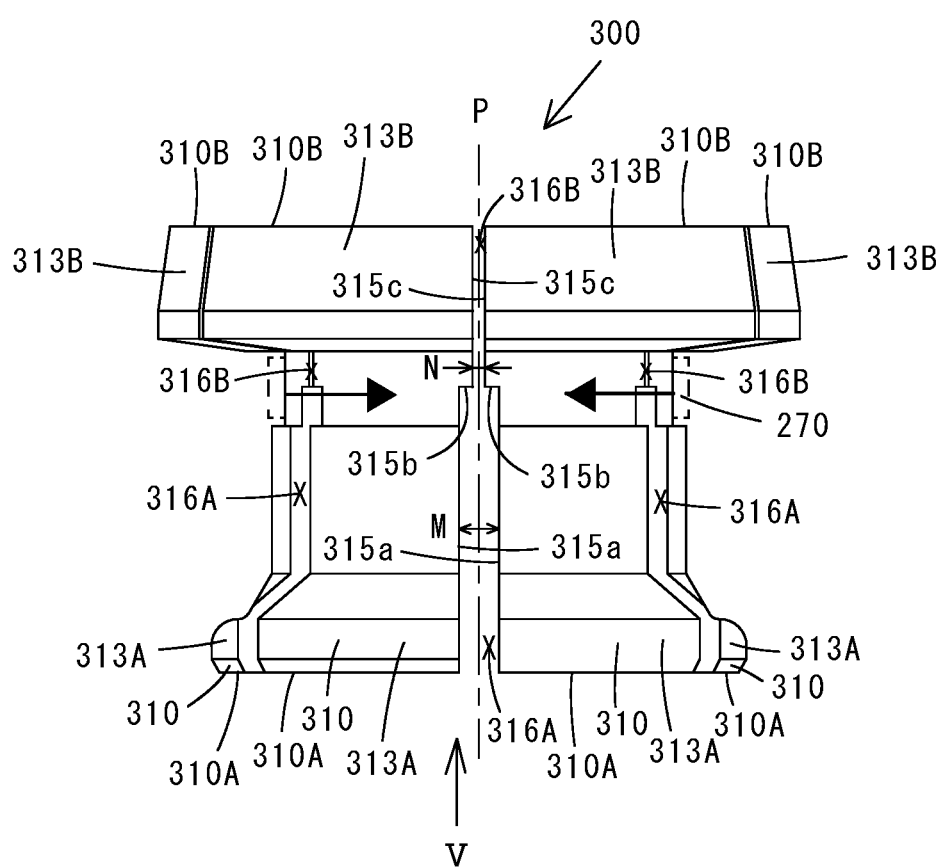
FIG. 4 is a side view of an embodiment of a collet used in the clamping mechanism that forms the clamping device of the first embodiment.
Figure 5:
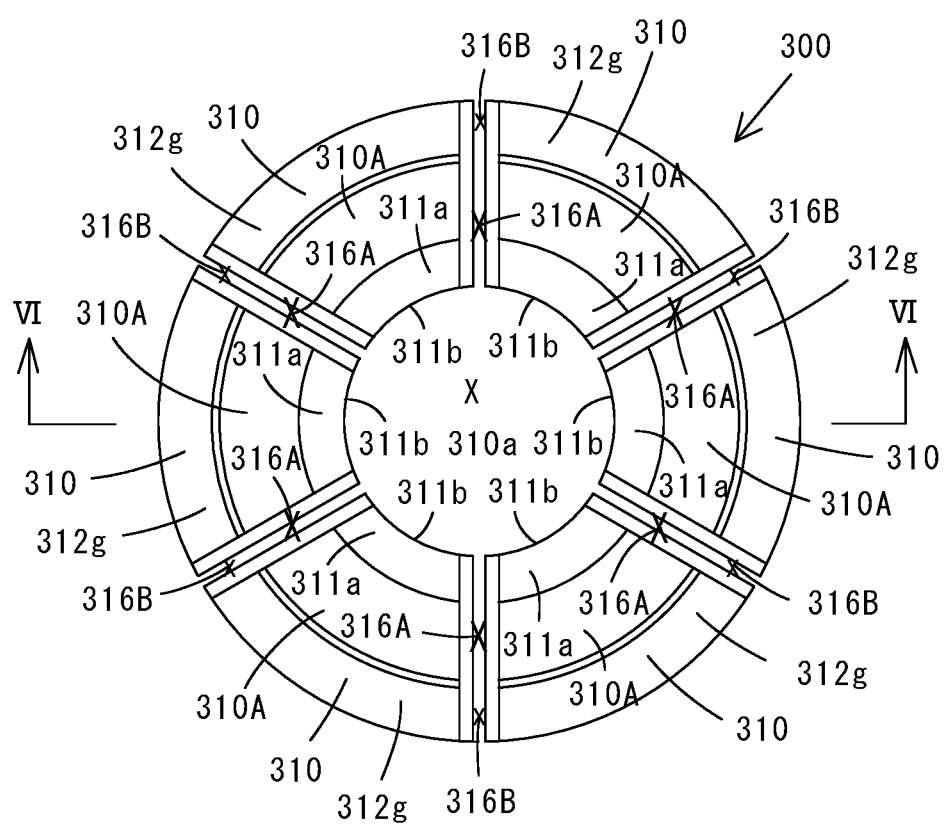
FIG. 5 is a view as seen from the direction of arrow V in FIG. 4.
Figure 6:
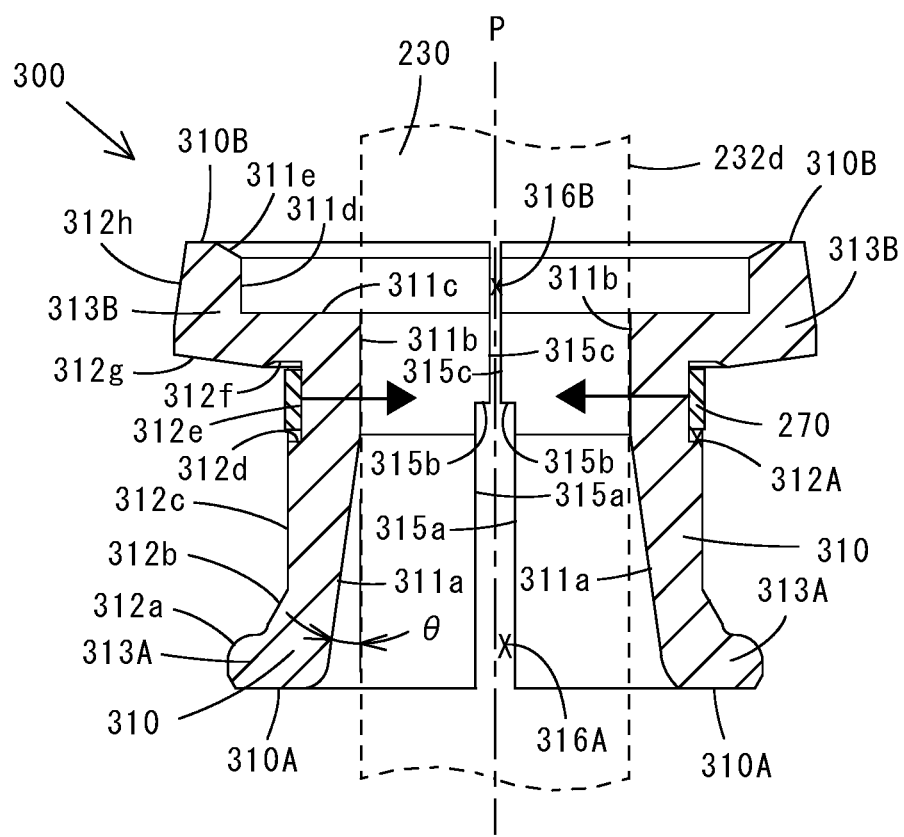
FIG. 6 is a cross-sectional view taken along line VI-VI in FIG. 5.

One embodiment of the collet 300 will now be described with reference to FIGS. 4 to 6. FIG. 4 is a side view of the collet 300, FIG. 5 is a view as seen from the direction of arrow V in FIG. 4, and FIG. 6 is a cross-sectional view taken along line VI-VI in FIG. 5.

The collet 300 has a plurality of collet members 310.

The collet members 310 are disposed on the radially outer side of the shaft member 230, along (around) the circumferential direction on the front end side of the actuation member 240.

The collet members 310 extend along (around) the circumferential direction and the center line P (H1) on the radially outer side of the shaft member 230, and each has a collet member front end surface 310A, a collet member rear end surface 310B, a collet member inner peripheral surface 311 formed on the inner peripheral side, a collet member outer peripheral surface 312 formed on the outer peripheral side, and a collet member side surface 315 formed on one side and the other side along the circumferential direction. As shown in FIG. 5, the collet members 310 extend in a circular arc shape along (around) the shaft member outer peripheral surface 232 when viewed from one side along the center line P.

Each of the collet member inner peripheral surfaces 311 has collet member inner peripheral surface portions 311a to 311e. The collet member inner peripheral surface portion 311e is formed as a tapered surface inclined such that the distance from the center line P increases going from the front end side toward the rear end side.

The collet member inner peripheral surface portion 311a extends at an inclination angle θ to the extending direction of the collet member inner peripheral surface portion 311b when viewed in cross-section taken along the center line P (H1) (see FIG. 6). The inclination angle θ is set such that the distance between an extension line of the collet member inner peripheral surface portion 311b and the collet member inner peripheral surface portion 311a increases going from the rear end side toward the front end side.

The other end of the spring 280 abuts the collet member inner peripheral surface portion 311c.

Each of the collet member outer peripheral surfaces 312 has collet member outer peripheral surface portions 312a to 312h. The collet member outer peripheral surface portion 312g is formed as a tapered surface inclined such that the distance from the center line P (H1) decreases going from the rear end side toward the front end side.

A projection 313A, which protrudes radially outward at a front end side of each of the collet members 310, is defined by the collet member front end surface 310A and the collet member outer peripheral surface portion 312a. The projections 313A are configured to be engageable with the recess 523 of the tool holder 510.

A projection 313B, which protrudes radially outward at a rear end side of each of the collet members 310, is defined by the collet member rear end surface 310B, the collet member outer peripheral surface portions 312g, 312h, and the collet member inner peripheral surface portions 311b to 311e. The projections 313B are configured to be abuttable on the abutment part of the actuation member 240. Specifically, for each collect member 310, the collet member inner peripheral surface portion 311e that forms the projection 313B is configured to be abuttable on the actuation member front end surface portion 240A2 of the actuation member 240.

The inclination angle θ of the extending direction of the collet member inner peripheral surface portion 311b to the extending direction of the collet member inner peripheral surface portion 311a of each collet member 310 is set such that the projection 313A is engageable with the recess 523 of the tool holder 510, which has been inserted into the shank part insertion space 122, in the state in which the collet member inner peripheral surface portion 311b has been moved close to (including in abutment with) the shaft member outer peripheral surface 232 (the shaft member outer peripheral surface portion 232d) of the shaft member 230. Further, the inclination angle θ is set such that the projections 313A are not engageable with the recess 523 of the tool holder 510 (engagement between the projections 313A and recess 523 is released), which has been inserted into the shank part insertion space 122, in the state in which the collet member inner peripheral surface portion 311a has moved close to (including in abutment with) the shaft member outer peripheral surface 232 (the shaft member outer peripheral surface portion 232d) of the shaft member 230.

Each of the collet member inner peripheral surface portions 311b corresponds to a "first collet member inner peripheral surface portion" of the present teachings, and each of the collet member inner peripheral surface portions 311a corresponds to a "second collet member inner peripheral surface portion" of the present teachings. Each of the projections 313A corresponds to a "first projection that protrudes radially outward from an end part on the front end side (opposite to the first chamber) of the collet member" of the present teachings, and each of the projections 313B corresponds to a "second projection that protrudes radially outward from an end part on the rear end side (the first chamber side) of the collet member" of the present teachings.

As shown in FIGS. 4 to 6, a clearance 316 is formed extending along the center line P between each two of the collet members 310 that are adjacent in the circumferential direction in the state in which the collet member inner peripheral surface portions 311b of the collet members 310 are in abutment with the shaft member outer peripheral surface portion 232d (the extending direction of the collet member inner peripheral surface portion 311b is parallel to the extending direction of the shaft member 230). The clearance 316 includes a clearance 316B and a clearance 316A, which is formed on the front end side of the clearance 316B and has a larger width than the clearance 316B. Specifically, as shown in FIG. 4, the collet member side surfaces 315 of the collet members 310 each has collet member side surface portions 315a to 315c. The collet member side surface portions 315a and 315c extend along the center line P. Each of the collet member side surface portions 315b is formed as a step surface that connects the collet member side surface portions 315a and 315c in a stepwise shape.

In this embodiment, the clearance 316B extends along the center line P with a clearance width N. The clearance 316A extends along the center line P with a clearance width M that is larger than the clearance width N of the clearance 316B (M>N).

The clearance 316B corresponds to a "first clearance formed on the rear end side between the collet members" of the present teachings, and the clearance 316A corresponds to a "second clearance formed on the front end side between the collet members" of the present teachings.

In this embodiment, as described below, the collet 300 is set (moved, shifted) to a clamping mode (state, position, orientation) in which the collet member inner peripheral surface portions 311b have moved close to the shaft member outer peripheral surface portion 232d while the collet member inner peripheral surface portions 311a are spaced apart from the shaft member outer peripheral surface portion 232d. In addition, the collet 300 is set (moved, shifted) to an unclamping mode (state, position, orientation) in which the collet member inner peripheral surfaces portion 311b are spaced apart from the shaft member outer peripheral surface portion 232d while the collet member inner peripheral surface portions 311a have moved close to the shaft member outer peripheral surface portion 232d. Here, the collet 300 is required to be configured such that the collet members 310 adjacent to each other in the circumferential direction do not contact each other when the collet 300 is switched from the clamping mode to the unclamping mode. For example, the circumferentially adjacent collet members 310 are disposed at wide intervals.

However, if the circumferentially adjacent collet members 310 are disposed with large gaps, then the clearance width between the circumferential collet members 310 may vary in the state (clamping mode) in which the collet member inner peripheral surface portions 311b have moved close to the shaft member outer peripheral surface portion 232d. If the clearance width between the circumferential collet members 310 varies, then the clamping force of the tool holder 510 exerted by each of the collet members 310 varies and thus the retaining (holding) characteristics of the tool holder 510 may be deteriorated.

In this embodiment, clearances having different clearance widths are formed between the collet members 310 adjacent to each other in the circumferential direction. Further, the clearance width M of the clearances 316A formed on the front end side is larger than the clearance width N of the clearances 316B formed on the rear end side.

By widening the clearance width M of the clearance 316A formed on the front end side, the circumferentially adjacent collet members 310 can be prevented from contacting each other when setting to the unclamping mode. Further, by narrowing the clearance width N of the clearances 316B formed on the rear end side, variation in the clearance width between the collet members 310 can be prevented when the clamping mode is set. Thus, the clamping force of the tool holder 510 by each of the collet members 310 can be generally same and the tool holder 510 can be stably retained.

The annular spring 270 generates an elastic force that urges each of the collet members 310, which are disposed around the circumferential direction, to move radially inward. In this embodiment, a C-shaped annular spring is used as the annular spring 270. An O-ring may also be used as the annular spring 270.

In this embodiment, as shown in FIG. 6, a groove 312A is formed by the collet member outer peripheral surface portions 312d to 312f. The groove 312A is formed on the front end side of the projections 313B and at a position of the collet member outer peripheral surface 312 that corresponds to the collet member inner peripheral surface portion 311b, and extends in the circumferential direction.

The annular spring 270 is inserted in an extended state in the grooves 312A of each of the collet members 310 disposed around the circumferential direction. Thus, the elastic force of the annular spring 270 acts as a force that moves the collet member inner peripheral surface portions 311b of the collet members 310 toward the shaft member outer peripheral surface portion 232d.

The annular spring 270 corresponds to a "second elastic member" of the present teachings.

The spring 280 is disposed in a compressed state between each of the collet members 310 and the actuation member 240 (the movable member 210). The elastic force of the spring 280 acts as a force that moves each of the collet members 310 and the actuation member 240 (the movable member 210) away from each other. Each of the collet members 310 are restricted (blocked) by the body inner peripheral surface portions 120d from moving along the center line H1 relative to the body 110 toward the front end side (in the direction opposite to the closed space 121). Therefore, the elastic force of the spring 280 acts as a force that moves each of the collet members 310 relative to the actuation member 240 (of the movable member 210) toward the front end side. Thus, each of the collet members 310 is held in abutment on the body inner peripheral surface portion 120d regardless of movement of the movable member 210.

The spring 280 corresponds to a "third elastic member" of the present teachings.

Referring again now to FIGS. 1 and 3, the driving mechanism 400 is disposed in the body interior space 130. In this embodiment, the driving mechanism 400 is disposed such that center line Q of the driving mechanism 400 coincides (including "generally coincides") with the center line H2 of the body interior space 130.

In the following description of the driving mechanism 400, the opening side (right side in FIGS. 1 and 3) is referred to as the "rear end side" and the opposite side to the opening (left side in FIGS. 1 and 3) is referred to as the "front end side", along the extending direction of the body interior space 130 (the center line H2) and the extending direction of the driving mechanism 400 (the center line Q).

As shown in FIG. 3, the driving mechanism 400 is constituted by a rotary member 410 and a movable member 430 that is disposed on the front end side (the closed space 131 side) of the rotary member 410.

The rotary member 410 is disposed in a body interior space portion defined by the body inner peripheral surface portions 130f to 130i. The rotary member 410 has a tubular shape and has a rotary member front end surface 410A, a rotary member inner peripheral surface 411 that defines a rotary member interior space 410a having an opening at the front end side, and a rotary member outer peripheral surface 412. The rotary member inner peripheral surface 411 and the rotary member outer peripheral surface 412 have a circular shaped cross-section.

The rotary member inner peripheral surface 411 has rotary member inner peripheral surface portions 411a to 411d. The rotary member inner peripheral surface portion 411b is formed as a step surface that extends in a direction crossing (orthogonal to) the extending direction of the center line H2 and connects the rotary member inner peripheral surface portions 411a and 411c. The rotary member inner peripheral surface portion 411d forms a bottom surface of the rotary member interior space 410a. A female thread is formed in the rotary member inner peripheral surface portion 411c.

Bearing members 420 are disposed between the rotary member outer peripheral surface 412 and the body inner peripheral surface portion 130g. Thus, the rotary member 410 is rotatable around the center line H2 relative to the body 110.

In this embodiment, the rotary member 410 is driven by a motor.

The movable member 430 includes a shaft member 440 and a piston 450, which is disposed on the front end side (the closed space 131 side) of the shaft member 440. In this embodiment, the movable member 430 is constituted by connecting the shaft member 440 and the piston 450, which are separately formed from each other, using bolts, etc. The movable member 430 can instead be formed as a single (integral) member.

The movable member 430 corresponds to a "second movable member" of the present teachings.

The shaft member 440 has a shaft member front end surface 440A, a shaft member rear end surface 440B and a shaft member outer peripheral surface 442. The shaft member outer peripheral surface 442 has a circular shaped cross-section.

The shaft member outer peripheral surface 442 has shaft member outer peripheral surface portions 442a to 442f.

A male thread, which is threadably engaged with the female thread formed in the rotary member inner peripheral surface portion 411c, is formed on the shaft member outer peripheral surface portion 442f. Further, rotation of the shaft member 440 is restricted (blocked) by a rotation preventing member 460. Accordingly, the shaft member 440 moves along the center line H2 when the rotary member 410 rotates. Thus, the shaft member 440 acts as a motion converting part that converts rotational motion of the rotary member 410 into linear motion along the center line H2.

The shaft member 440 corresponds to a "second shaft member of the second movable member" of the present teachings.

The piston 450 has a piston front end surface 450A, a piston rear end surface 450B and a piston outer peripheral surface 452. The piston outer peripheral surface 452 has a circular shaped cross-section.

An O-ring 453 is disposed between the piston outer peripheral surface 452 and the body inner peripheral surface portion 130b. Thus, the closed space 131 is defined by the body inner peripheral surface portions 130a, 130b and the piston 450 (the piston front end surface 450A). Specifically, the piston 450 defines the variable volume of the closed space 131.

It is noted that a power transmitting medium is filled in the closed spaces 121, 131 and the communication passage 140. In this embodiment, oil is used as the power transmitting medium.

The piston 450 corresponds to a "second piston of the second movable member" of the present teachings.

Operation of the clamping device 100 of the first embodiment will now be described with reference to FIGS. 8 to 13.

Figure 8:
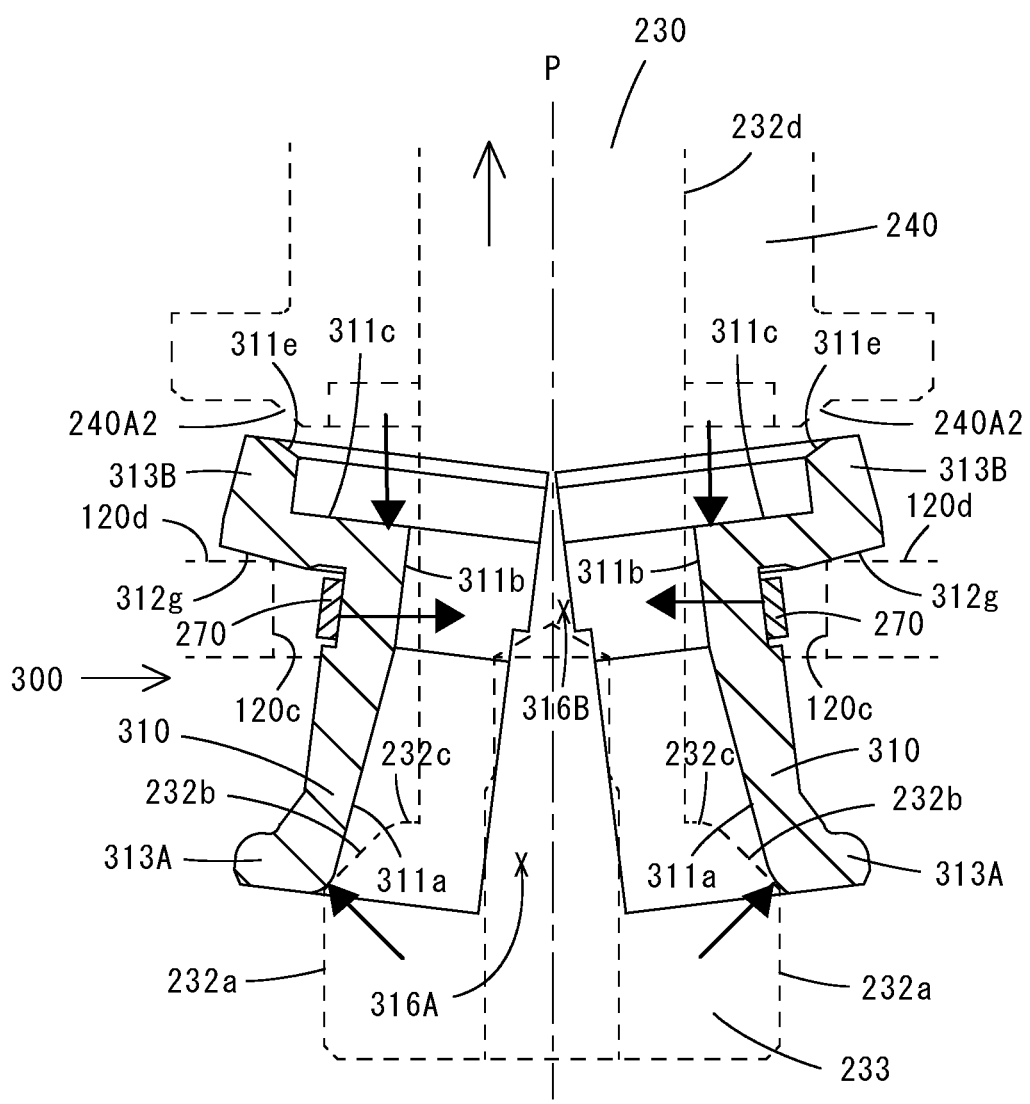
FIG. 8 shows the collet in a state in which a shank part of the member to be clamped is not inserted into a shank part insertion space when the clamping device of the first embodiment is set to a clamping mode (shown in FIG. 1).

The state, in which the collet 300 is set to the clamping mode while the shank part 520 of the tool holder 510 is not inserted in the shank part insertion space 122, is shown in FIGS. 1 and 8.

In the situation in which the collet 300 will be set to the clamping mode, the rotary member 410 of the driving mechanism 400 is rotated in one direction, for example, in a counterclockwise direction. When the rotary member 410 rotates in the one direction, the movable member 430 (the shaft member 440, the piston 450) moves in the direction opposite to the closed space 131 (in the direction that increases the volume of the closed space 131) along the center line H2. Thus, the movable member 210 (the piston 220, the shaft member 230, the actuation member 240, the pressing member 250) of the clamping mechanism 200 will move along the center line H1 in the direction toward the closed space 121 (in the direction that reduces the volume of the closed space 121) due to the elastic force of the disc spring 260.

At this time, each of the collet members 310 that forms the collet 300 is held in abutment with the body inner peripheral surface portion 120d by the elastic force of the spring 280. Then, by moving the movable member 210 in the direction toward the closed space 121, abutment between the actuation member 240 and the projections 313B of the collet members 310 (specifically, abutment between the actuation member front end surface portion 240A2 and the collet member inner peripheral surface portions 311e) is released. Thus, due to the elastic force of the annular spring 270, the collet member inner peripheral surface portions 311b of the collet members 310 move toward the shaft member outer peripheral surface 232 (the shaft member outer peripheral surface portion 232d) of the shaft member 230, and the collet member inner peripheral surface portions 311a and the projections 313A move radially outward (in a direction away from the shaft member 230).

Further, by moving the movable member 210 in the direction toward the closed space 121, the projection 233 (specifically, the shaft member outer peripheral surface portion 232b that forms the projection 233) of the shaft member 230 abuts on a portion of the collet member inner peripheral surface portions 311a of the collet members 310. Due to the projection 233 of the shaft member 230 abutting on the collet member inner peripheral surface portions 311a of the collet members 310, a force that moves the projections 313A radially outward is applied. This force can be added to the clamping force by the elastic force of the annular spring 270. Thus, the clamping force is increased.

Figure 9:
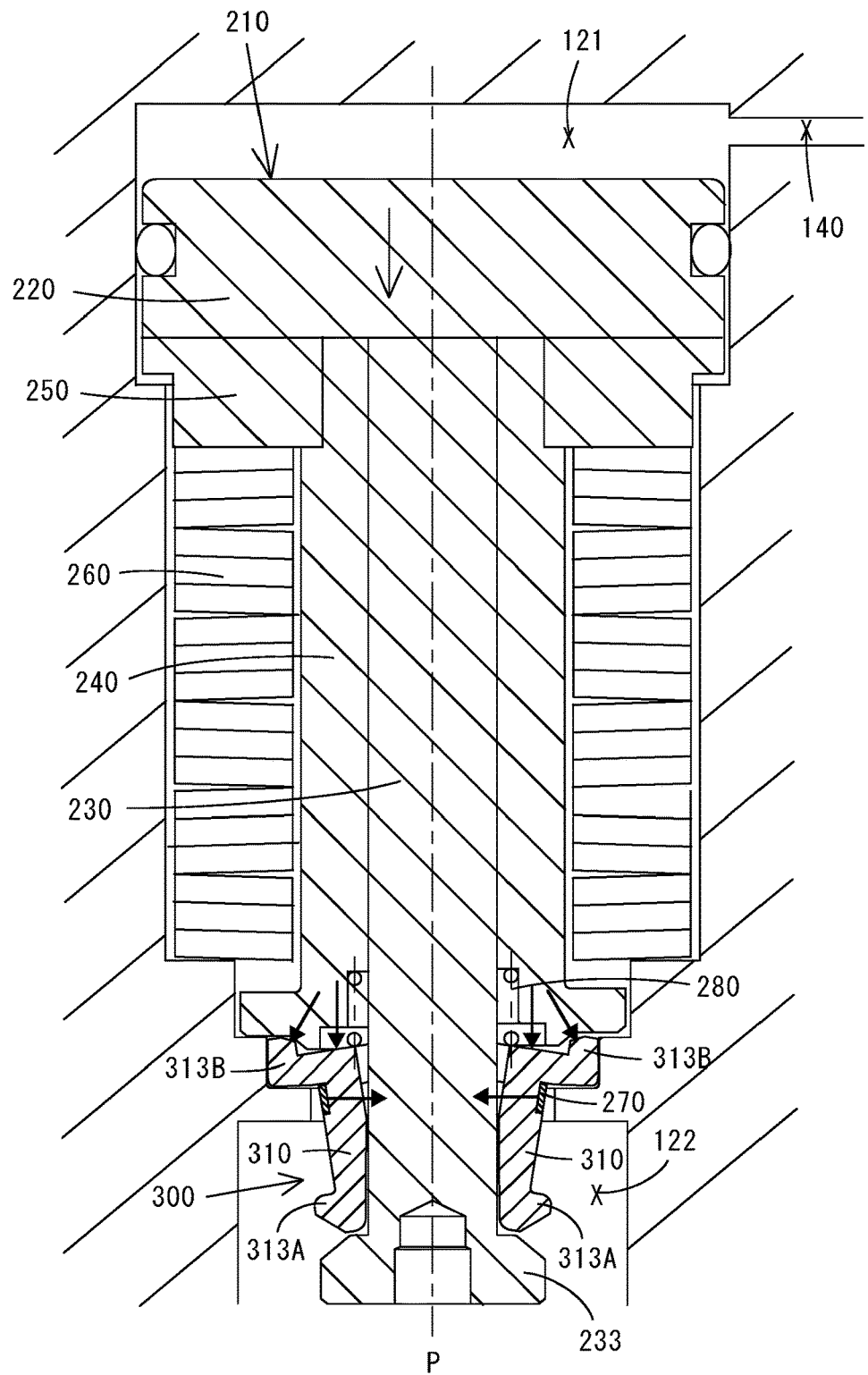
FIG. 9 shows a state in which the shank part of the member to be clamped is not inserted into the shank part insertion space in a state in which the clamping device of the first embodiment is set to an unclamping mode.
Figure 10:
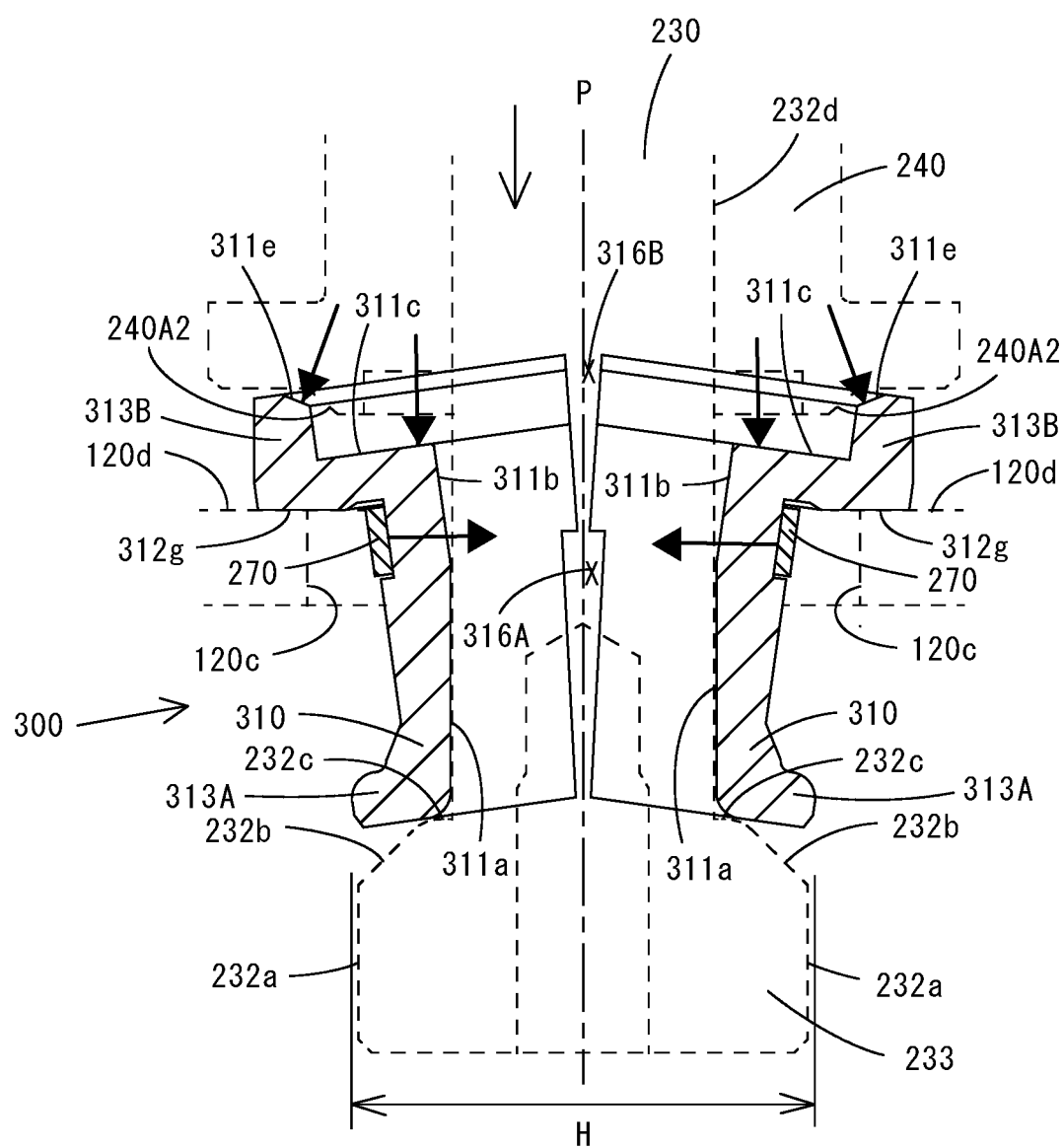
FIG. 10 shows the collet in the state shown in FIG. 9.
Figure 11:
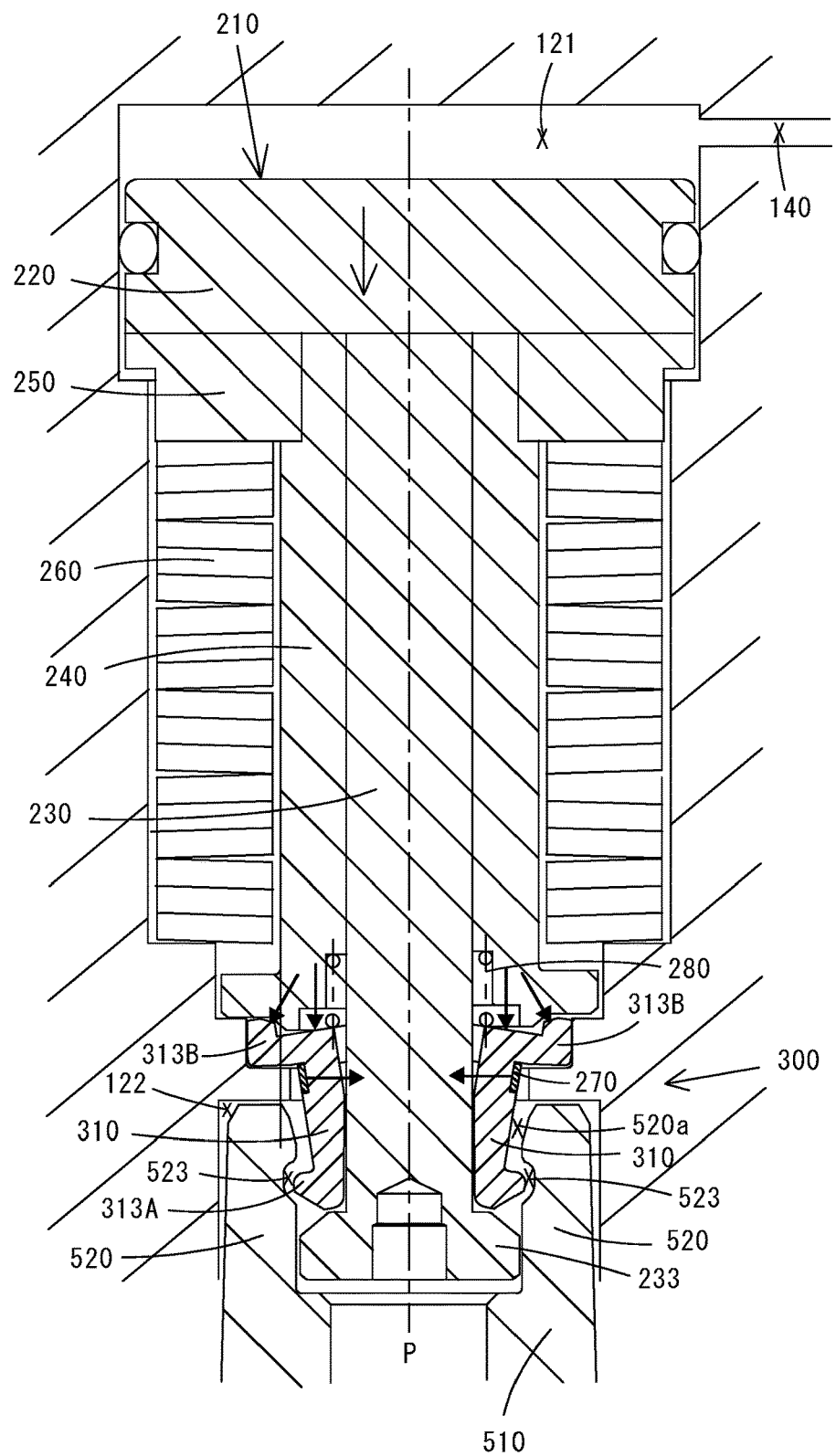
FIG. 11 shows a state in which the shank part of a tool holder is inserted into the shank part insertion space in the state in which the clamping device of the first embodiment is set to the unclamping mode.

Next, an operation for inserting the shank part 520 of the tool holder 510 into the shank part insertion space 122 will be described with reference to FIGS. 9 to 11.

In order to insert the shank part 520 of the tool holder 510 into the shank part insertion space 122, the collet 300 is required to be set to the unclamping mode.

In the situation in which the collet 300 will be set to the unclamping mode, the rotary member 410 of the driving mechanism 400 is rotated in the other direction, for example, in the clockwise direction. When the rotary member 410 rotates in the other direction, the movable member 430 moves in the direction toward the closed space 131 (in the direction that reduces the volume of the closed space 131) along the center line H2. Thus, the pressure in the closed space 121 of the clamping mechanism 200 increases and causes the movable member 210 to move in the direction opposite to the closed space 121 (in the direction that increases the volume of the closed space 121) along the center line H1 against the elastic force of the disc spring 260.

By moving the movable member 210 in the direction opposite to the closed space 121, abutment between the projection 233 of the shaft member 230 and the collet member inner peripheral surface portions 311a of the collet members 310 is released (terminated).

At this time, the spring 280 is compressed because the movable member 210 has moved in the direction opposite to the closed space 121. Each of the collet members 310 that forms the collet 300 is held in abutment on the body inner peripheral surface portion 120d by the elastic force of the spring 280.

Further, due to the movement of the movable member 210 in the direction opposite to the closed space 121, the actuation member 240 abuts on the projections 313B of the collet members 310 (specifically, the actuation member front end surface portion 240A2 abuts on the collet member inner peripheral surface portions 311e). Due to the abutment of the actuation member 240 on the projections 313B, a force that moves the projections 313B radially outward is applied from the actuation member 240 (the actuation member front end surface portion 240A2) to the projections 313B (the collet member inner peripheral surface portions 311e) of the collet members 310. Thus, the collet member inner peripheral surface portions 311b of the collet members 310 move radially outward (in a direction away from the shaft member 230) against the elastic force of the annular spring 270. At the same time, the collet member inner peripheral surface portions 311a and the projections 313A move in a direction toward the shaft member outer peripheral surface 232 (the shaft member outer peripheral surface portion 232d) of the shaft member 230. (see FIGS. 9 and 10)

Then, in the state in which the collet 300 is set to the unclamping mode, the shank part 520 of the tool holder 510 can be inserted into the shank part insertion space 122. At this time, the projections 313A of the collet members 310 will be inserted into the shank part interior space 520a of the tool holder 510 (see FIG. 11). The projections 313A of the collet members 310 are disposed at a position that faces the recess 523 formed in the shank part inner peripheral surface of the tool holder 510.

It is noted that, in the state in which the collet 300 has been set to the unclamping mode, the maximum outer diameter H (see FIG. 10) of the projections 313A of the collet members 310 is set to be smaller than the inner diameter D (see FIG. 7) of the shank part interior space 520a (H<D).

Figure 12:
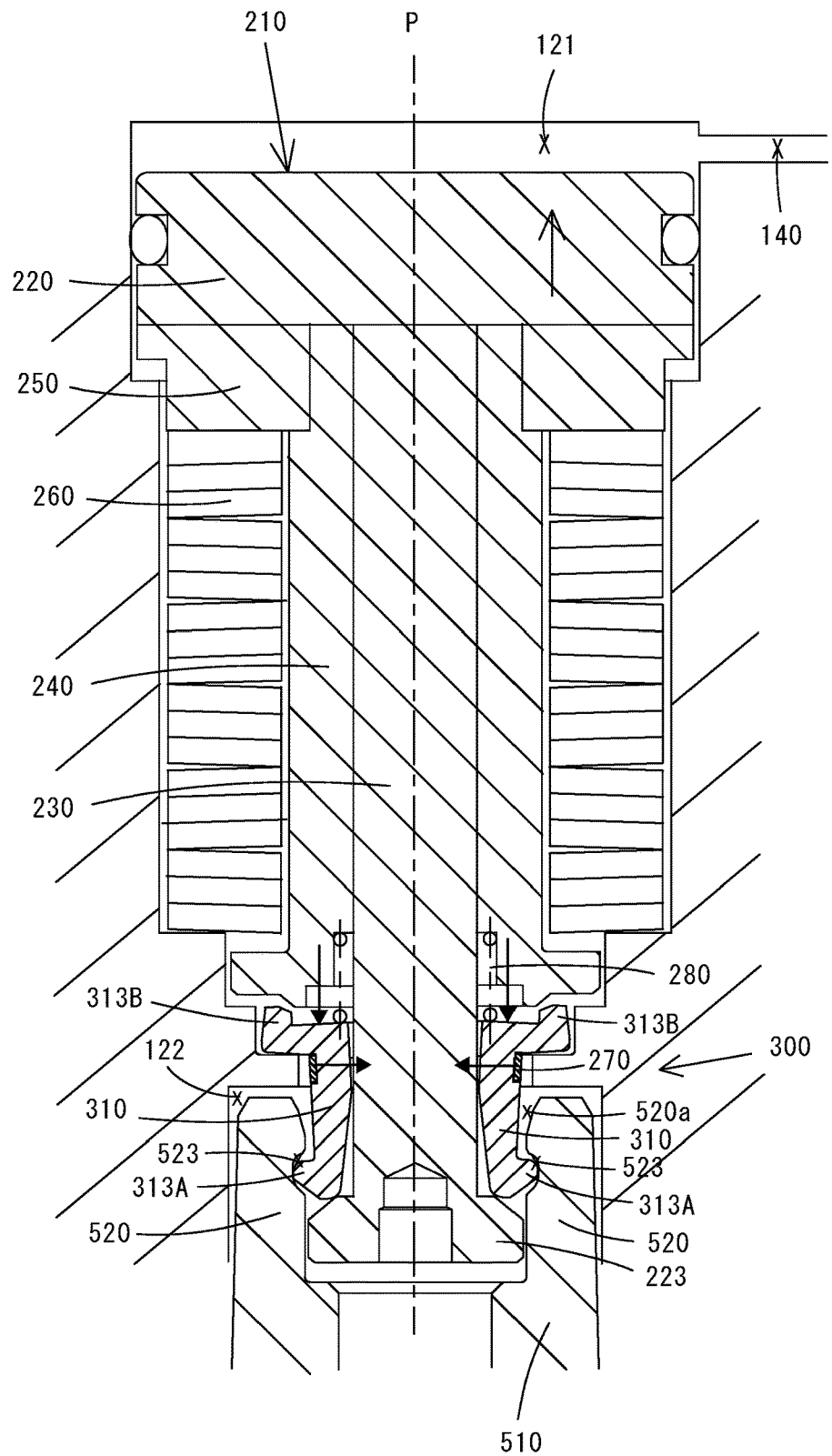
FIG. 12 shows a state in which the clamping device of the first embodiment is set to the clamping mode in the state in which the shank part of the tool holder is inserted into the shank part insertion space.
Figure 13:
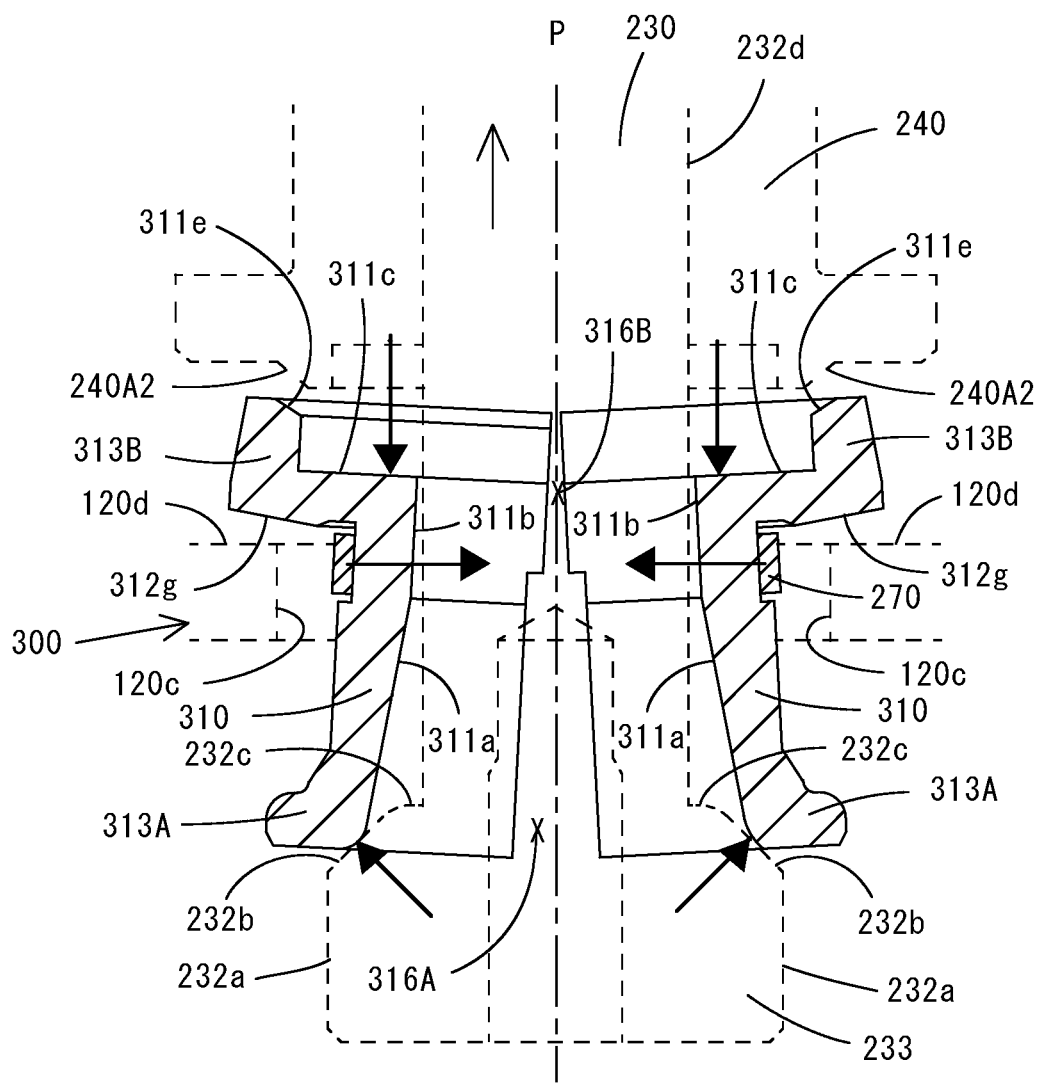
FIG. 13 shows the collet in the state shown in FIG. 12.

Next, an operation for clamping the tool holder 510 will be described with reference to FIGS. 12 and 13.

The collet 300 can be set to the clamping mode in the state in which the shank part 520 of the tool holder 510 has been inserted into the shank part insertion space 122.

As described above, in the situation in which the collet 300 will be set to the clamping mode, the rotary member 410 of the driving mechanism 400 is rotated in one direction, so that the movable member 430 is moved along the center line H2 in the direction opposite to the closed space 131. Thus, the movable member 210 of the clamping mechanism 200 is caused to be moved in the direction toward the closed space 131 along the center line H1 due to the elastic force of the disc spring 260.

By moving the movable member 210 of the clamping mechanism 200 in the direction toward the closed space 121, abutment between the shaft member 230 and the projections 313B of the collet members 310 is released (terminated). Then, the collet member inner peripheral surface portions 311b of the collet members 310 move toward the shaft member outer peripheral surface 232 of the shaft member 230 due to the elastic force of the annular spring 270. At the same time, the collet member inner peripheral surface portions 311a and the projections 313A move radially outward (away from the shaft member outer peripheral surface 232). By moving the projections 313A radially outward, the projections 313A engage with the recess 523 of the tool holder 510. Further, by abutting the projection 233 of the shaft member 230 on portions of the collet member inner peripheral surface portions 311a, a force that moves the projections 313A radially outward is applied. Thus, the clamping force can be increased.

It is noted that movement of the projections 313A toward the radially outward side of the projections is restricted (blocked) by being engaged with the recess 523 of the tool holder 510.

Although the clamping device 100 of the first embodiment is configured such that the extending direction of the body interior space 120 (the center line H1) in which the clamping mechanism 200 is disposed is orthogonal to the extending direction of the body interior space 130 (the center line H2) in which the driving mechanism 400 is disposed, the extending direction of the body interior space 120 and the extending direction of the body interior space 130 can be appropriately set (modified).

Figure 14:
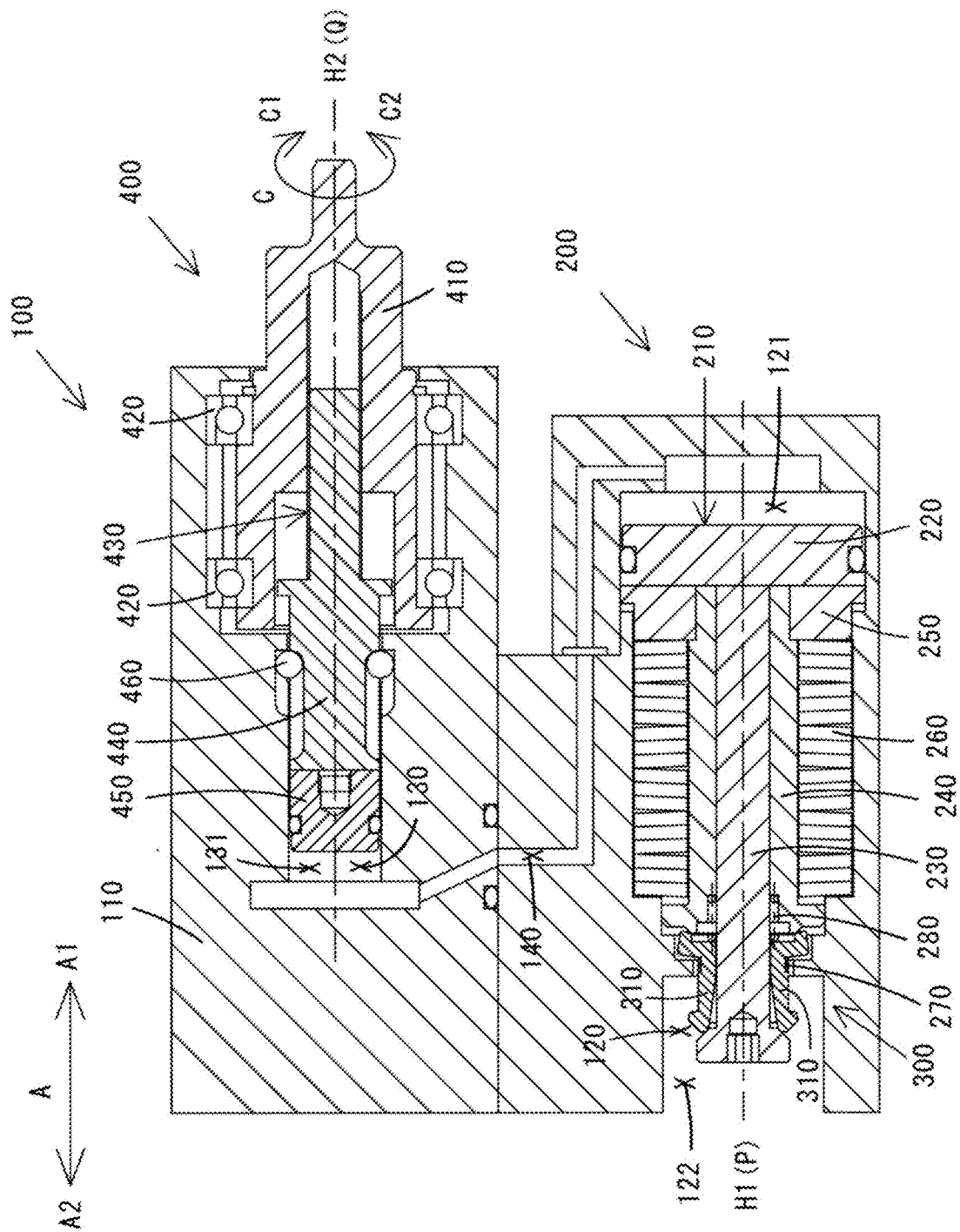
FIG. 14 is a cross-sectional view of a clamping device according to a second embodiment of the present teachings.

A clamping device of a second embodiment is shown in FIG. 14. The clamping device 100 of the second embodiment has the same configuration as the clamping device 100 of the first embodiment except that the extending direction of the body interior space 120 (the center line H1) is parallel to the extending direction of the body interior space 130 (H2) and the shape of the communication passage 140 is different.

In the present teachings, because closed spaces, which are filled with a power transmitting medium, are used as a power transmitting mechanism between the driving mechanism and the clamping mechanism, it can be easily configured at a low cost. In particular, in the situation in which the extending direction of the body interior space in which the driving mechanism is disposed and the extending direction of the body interior space in which the clamping mechanism is disposed will be modified, the design change is easy because it is only necessary to change the body interior spaces that are formed in the body and the communication passage.

Figure 15:
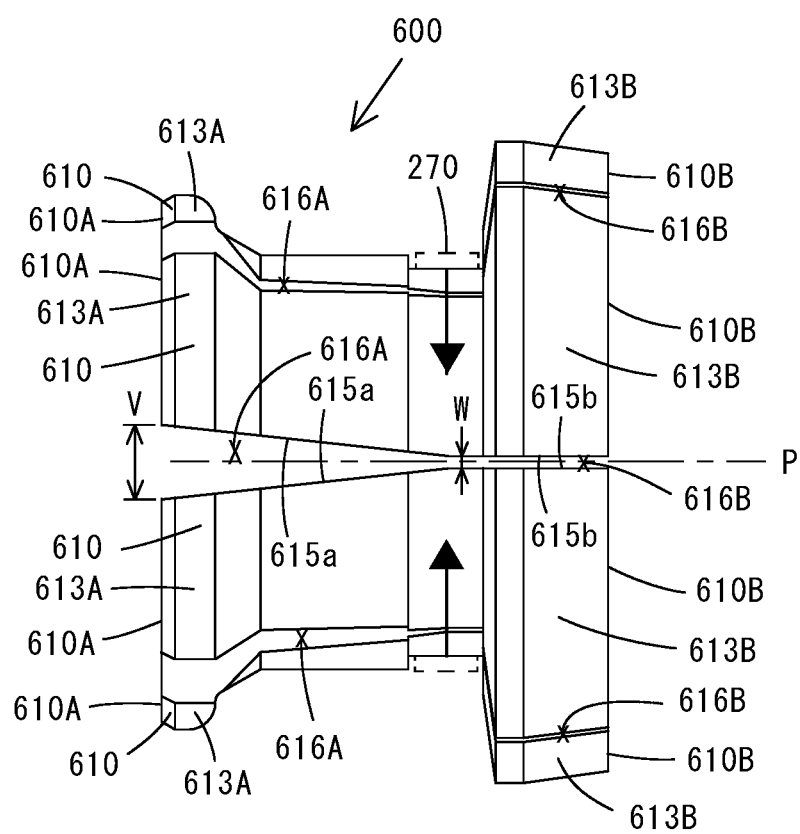
FIG. 15 is a side view of a different embodiment of a collet.
Figure 16:
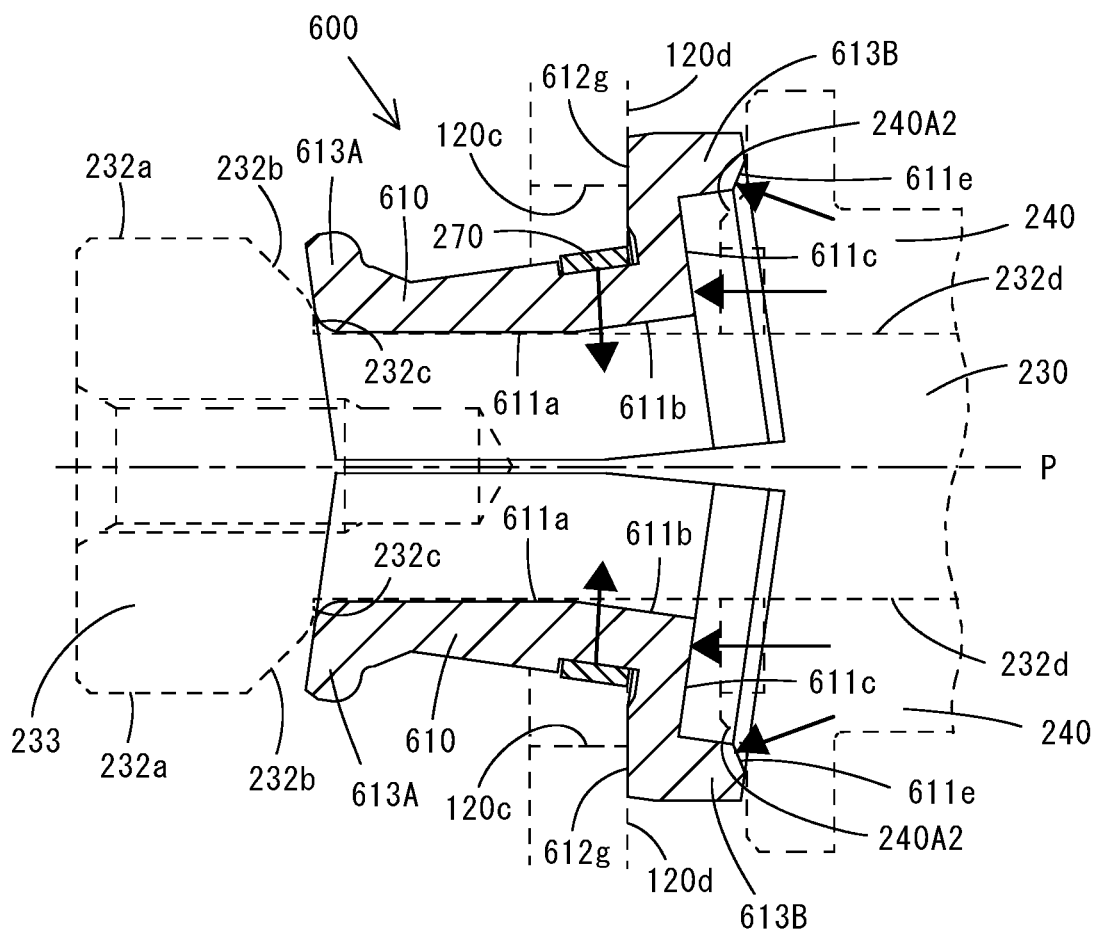
FIG. 16 shows the collet of another embodiment in a state being set to the unclamping mode.

Another embodiment of a collet 600 is shown in FIGS. 15 and 16 in which the shape of the clearances, which are formed between each two of the collet members that are adjacent in the circumferential direction, has been modified.

Like the collet 300, the collet 600 is constituted by a plurality of collet members 610.

The collet members 610 are disposed along (around) the circumferential direction on the radially outer side of the shaft member outer peripheral surface portion 232d of the shaft member 230 of the movable member 210. Like the collet 300, it is configured such that the elastic force of the annular spring 270 acts as a force that moves a collet member inner peripheral surface portion 611b of each of the collet members 610 toward the shaft member outer peripheral surface portion 232d and moves a collet member inner peripheral surface portion 611a and a projection 613A radially outward (away from the shaft member outer peripheral surface portion 232d).

Further, when viewed in a cross-section along the extending direction of the shaft member 230 (the center line P), a clearance 616 is formed between each two of the collet members 610 that are adjacent in the circumferential direction in the state in which the extending direction of a collet member inner peripheral surface portion 611b of each of the collet members 610 is parallel to the extending direction of the shaft member outer peripheral surface portion 232d. Each of the clearances 616 includes a clearance 616A and a clearance 616B. The clearance 616A is formed on the front end side of the clearance 616B.

Each of the clearances 616B extends along the center line P and has clearance width W. Each of the clearances 616A extends along the center line P and has a clearance width that gradually increases from a rear end of the clearance width W to a front end of clearance width V (V>W).

Specifically, a collet member side surface 615 of each of the collet members 610 has collet member side surface portions 615a and 615b. Each of the collet member side surface portions 615b extends in parallel (including "generally parallel") to the center line P, and each of the collet member side surface portions 615a extends obliquely to the extending direction of the respective collet member side surface portion 615b (see FIG. 15).

The collet 600 of this embodiment also has the same effects as the collet 300.

Each of the clearances 616B corresponds to a "first clearance formed on the rear end side between the collet members" of the present teachings, and each of the clearances 616A corresponds to a "second clearance formed on the front end side between the collet members" of the present teachings.

The present invention is not limited to the above-described embodiments, but rather, may be added to, changed, replaced with alternatives or otherwise modified.

In the above-described embodiments, although clamping devices are described that are configured to clamp a tool holder that has a shank part and holds a tool, the present invention can be configured as a clamping device that clamps a variety of members to be clamped such as tools having a shank part. Thus, a tool holder that has a shank part and holds a tool, and a tool having a shank part are included in a "member to be clamped".

The shapes of the body interior space (the first body interior space) in which the clamping mechanism is disposed and the body interior space (the second body interior space)

in which the driving mechanism is disposed are not limited to those of the above-described embodiments.

The shapes and structures of the movable member (the piston, the shaft member, the actuation member, the pressing member), the disc spring, the annular spring, the spring and the collet, which form the clamping mechanism, are not limited to those of the above-described embodiments.

In the above-described embodiments, although the clamping mechanism has been constituted by the movable member (the piston, the shaft member, the actuation member, the pressing member), the disc spring, the annular spring, the spring and the collet, the members that constitute the clamping mechanism are not limited to them.

In the embodiments, although the movable member (the first movable member) of the clamping mechanism has been constituted by the piston, the shaft member, the actuation member and the pressing member, the configuration of the movable member (the first movable member) is not limited to this. Further, the movable member (the first movable member) can be configured as a single member or by connecting a plurality of members.

The shapes and configurations of the rotary member, the movable member (the shaft member and the piston), etc. that constitute the driving mechanism are not limited to those of the above-described embodiments.

In the embodiments, although the driving mechanism has been constituted by the rotary member and the movable member (the shaft member and the piston), the members that constitute the driving mechanism are not limited to them.

In the embodiments, although the movable member (the second movable member) of the driving mechanism has been constituted by the piston and the shaft member, the configuration of the movable member (the second movable member) is not limited to this. Further, the movable member (the second movable member) can be configured as a single member or by connecting a plurality of members.

Various kinds of well-known elastic members can be used as the elastic members.

The projections (the first and second projections) of the collet members, the projection of the shaft member, the disc spring, the annular spring and the spring may be appropriately selected as necessary.

Each of the features or configurations described in the above-described embodiments can be used alone or in combination of appropriately selected ones.

DESCRIPTION OF THE NUMERALS

100 Clamping device
110 Body
120 Body interior space (first body interior space)
120a to 120l Body inner peripheral surface portion
121 Closed space (first chamber)
122 Shank part insertion space
130 Body interior space (second body interior space)
130a to 130i Body inner peripheral surface portion
131 Closed space (second chamber)
140 Communication passage
200 Clamping mechanism
210 Movable member (first movable member)
220 Piston (first piston)
220A Piston front end surface
220B Piston rear end surface
222 Piston outer peripheral surface
223 O-ring (sealing member)
230 Shaft member (first shaft member)
230A Shaft member front end surface
230B Shaft member rear end surface
232 Shaft member outer peripheral surface
232a to 232d Shaft member outer peripheral surface portion
233 Projection
240 Actuation member
240A Actuation member front end surface
240A1 to 240A3 Actuation member front end surface portion
240B Actuation member rear end surface
241 Actuation member inner peripheral surface
241a to 241e Actuation member inner peripheral surface portion
242 Actuation member outer peripheral surface
242a to 242e Actuation member outer peripheral surface portion
250 Pressing member
250A Pressing member front end surface portion
250B Pressing member rear end surface
252 Pressing member outer peripheral surface
252a to 252c Pressing member outer peripheral surface portion
260 Disc spring (first elastic member)
270 Annular spring (reduced diameter spring) (second elastic member)
280 Spring (third elastic member)
300 Collet
310 Collet member
310A Collet member front end surface
310B Collet member rear end surface
310a Collet member interior space
311 Collet member inner peripheral surface
311a to 311e Collet member inner peripheral surface portion
312 Collet member outer peripheral surface
312 to 312h Collet member outer peripheral surface portion
313A Projection (first projection)
313B Projection (second projection)
315 Collet member side surface space
315a to 315c Collet member side surface portion
316A, 316B Clearance
400 Driving mechanism
410 Rotary member
410A Rotary member front end surface
411 Rotary member inner peripheral surface
411a to 411d Rotary member inner peripheral surface portion
412 Rotary member outer peripheral surface
420 Bearing member
430 Movable member (second movable member)
440 Shaft member (second shaft member)
440A Shaft member front end surface
440B Shaft member rear end surface
442 Shaft member outer peripheral surface
442a to 442f Shaft member outer peripheral surface portion
450 Piston (second piston)
450A Piston front end surface
450B Piston rear end surface
452 Piston outer peripheral surface
453 O-ring (sealing member)
460 Rotation preventing member
510 Tool holder (member to be clamped)
510a Tool holder interior space
510B Tool holder rear end surface
511 Tool holder inner peripheral surface 511a to 511f Tool holder inner peripheral surface portion
512 Tool holder outer peripheral surface
512a to 512c Tool holder outer peripheral surface portion
520 Shank part
520a Shank part interior space
523 Recess
550 Tool

The invention claimed is:

1. A clamping device configured to clamp a member having a shank part in which a recess is formed, comprising: a body, a clamping mechanism and a driving mechanism, wherein:
the body has a first body interior space, a second body interior space and a communication passage,
the clamping mechanism has a first movable member that is movable along an extending direction of the first body interior space, a first chamber having a volume that changes in response to movement of the first movable member, a first elastic member that generates an elastic force that urges the first movable member to move relative to the body in a first direction that reduces the volume of the first chamber, and a collet having a first projection that is engageable with the recess of the member to be clamped,
the collet is settable to a clamping mode in which the first projection becomes engaged with the recess in response to movement of the first movable member in the first direction, and is also settable to an unclamping mode in which the engagement between the first projection and the recess is released in response to movement of the first movable member in a second direction that increases the volume of the first chamber,
the driving mechanism has a second movable member that is movable along an extending direction of the second body interior space, and a second chamber having a volume that changes in response to movement of the second movable member,
the communication passage fluidly connects the first chamber and the second chamber,
a power transmitting medium is filled in the first chamber, the second chamber and the communication passage,
the first chamber has a first cross-sectional area that is larger than a second cross-sectional area of the second chamber, and
the clamping device is configured such that:
movement of the second movable member in a third direction that increases the volume of the second chamber causes the first movable member to move in the first direction due to the elastic force of the first elastic member, and thereby causes the collet to be set to the clamping mode,
movement of the second movable member in a fourth direction that reduces the volume of the second chamber causes the first movable member to move in the second direction against the elastic force of the first elastic member and thereby causes the collet to change to the unclamping mode.

2. The clamping device as defined in claim 1, wherein:
the driving mechanism includes a rotary member,
the second movable member is configured to be movable along the extending direction of the second body interior space in conjunction with rotation of the rotary member, and
the clamping device is configured such that:
rotation of the rotary member in one direction causes the second movable member to move in the third direction, and
rotation of the rotary member in an opposite direction causes the second movable member to move in the fourth direction.

3. The clamping device defined in claim 1, wherein:
the shank part of the member to be clamped has a shank part inner peripheral surface that defines a shank part interior space having an opening at one end, and the recess is formed in the shank part inner peripheral surface,
the first movable member includes a first piston that defines the volume of the first chamber, and a first shaft member provided on a side of the first piston that is opposite to the first chamber, the first shaft member extending along the extending direction of the first body interior space,
the collet comprises a plurality of collet members disposed around the circumferential direction on the radially outer side of the first shaft member,
each of the collet members has a collet member inner peripheral surface, a collet member outer peripheral surface, and the first projection that protrudes radially outward from an end part disposed on a side that is opposite to the first chamber,
each of the collet member inner peripheral surfaces has, when viewed in cross-section taken along the extending direction of the first shaft member, a first collet member inner peripheral surface portion, and a second collet member inner peripheral surface portion that is formed on a side of the first collet member inner peripheral surface portion opposite to the first chamber and extends at an inclination angle $\theta$ to an extending direction of the first collet member inner peripheral surface portion, the inclination angle $\theta$ being set such that the distance between an extension line of the first collet member inner peripheral surface portion and the second collet member inner peripheral surface portion increases from the first chamber side toward the opposite side to the first chamber, and
the clamping device is configured such that:
movement of the first piston in the first direction causes the first collet member inner peripheral surface portions of the collet members to move toward the first shaft member and thereby causes the collet to be set to the clamping mode, and
movement of the first piston in the second direction causes the second collet member inner peripheral surface portions of the collet members to move toward the first shaft member and thereby causes the collet to be changed to the unclamping mode.

4. The clamping device as defined in claim 3, wherein:
the clamping mechanism includes a second elastic member,
the second elastic member generates an elastic force that urges the first collet member inner peripheral surface portions of the collet members to move toward the first shaft member, and
the clamping device is configured such that:
movement of the first piston in the first direction causes the first collet member inner peripheral surface portions of the collet members to move toward the first shaft member due to the elastic force of the second elastic member, and
movement of the first piston in the second direction causes the second collet member inner peripheral surface portions of the collet members to move toward the first shaft member against the elastic force of the second elastic member.

5. The clamping device as defined in claim 4, wherein:
each of the collet members has a second projection protruding radially outward at an end part disposed on a side closest to the first chamber,
the first shaft member has an abutment part configured to be abuttable on the second projections of the collet members, and
the clamping device is configured such that:
movement of the first piston in the first direction causes the abutment part of the first movable member to separate from the second projections of the collet members and cause the first collet member inner peripheral surface portions of the collet members to move toward the first shaft member due to the elastic force of the second elastic member, and
movement of the first piston in the second direction causes the abutment part of the first movable member to abut on the second projections of the collet members and thereby apply a force that moves the second projections radially outward and move the second collet member inner peripheral surface portions of the collet members toward the first shaft member against the elastic force of the second elastic member.

6. The clamping device as defined in claim 3, wherein:
the first shaft member has a projection protruding radially outward at the end part opposite to the first chamber, and
the clamping device is configured such that:
movement of the first piston in the first direction causes the projection of the first shaft member to abut on a portion of the second collet member inner peripheral surface portions of the collet members and thereby apply a force that moves the second collet member inner peripheral surface portions away from the first shaft member, and
movement of the first piston in the second direction causes the projection of the first shaft member to separate from the portion of the second collet member inner peripheral surface portions of the collet members.

7. The clamping device as defined in claim 3, wherein:
the body has a movement restricting part at a prescribed position that restricts the collet members from moving in the second direction,
the clamping mechanism includes a third elastic member, and
the third elastic member generates an elastic force that urges the first piston away from the collet members.

8. The clamping device as defined in claim 2, wherein:
the second movable member includes a second piston that defines the volume of the second chamber, and a second shaft member provided on a side of the second piston opposite to the second chamber, the second shaft member extending along the extending direction of the second body interior space, and
the clamping device is configured such that the second shaft member is movable along the extending direction of the second body interior space in conjunction with rotation of the rotary member.

9. The clamping device as defined in claim 2, wherein:
the shank part of the member to be clamped has a shank part inner peripheral surface that defines a shank part interior space having an opening at one end,
the recess is formed in the shank part inner peripheral surface, the first movable member includes a first piston that defines the volume of the first chamber, and a first shaft member provided on a side of the first piston that is opposite to the first chamber, the first shaft member extending along the extending direction of the first body interior space,
the collet comprises a plurality of collet members disposed around the circumferential direction on the radially outer side of the first shaft member,
each of the collet members has a collet member inner peripheral surface, a collet member outer peripheral surface, and the first projection that protrudes radially outward from a second end part of the collet member that is disposed on a second side that farther from the first chamber than a first end part of the collet member that is disposed on a first side closest to the first chamber,
each of the collet member inner peripheral surfaces has, when viewed in cross-section taken along the extending direction of the first shaft member, a first collet member inner peripheral surface portion, and a second collet member inner peripheral surface portion that is formed on a side of the first collet member inner peripheral surface portion adjacent to the second end part and extends at an inclination angle θ to an extending direction of the first collet member inner peripheral surface portion,
the inclination angle θ is set such that the distance between an extension line of the first collet member inner peripheral surface portion and the second collet member inner peripheral surface portion increases from the first side in a direction toward the second side, and
the clamping device is configured such that:
movement of the first piston in the first direction causes the first collet member inner peripheral surface portions of the collet members to move toward the first shaft member and thereby causes the collet to be set to the clamping mode, and
movement of the first piston in the second direction causes the second collet member inner peripheral surface portions of the collet members to move toward the first shaft member and thereby causes the collet to be changed to the unclamping mode.

10. The clamping device as defined in claim 9, wherein:
the clamping mechanism includes a second elastic member,
the second elastic member generates an elastic force that urges the first collet member inner peripheral surface portions of the collet members to move toward the first shaft member, and
the clamping device is configured such that:
movement of the first piston in the first direction causes the first collet member inner peripheral surface portions of the collet members to move toward the first shaft member due to the elastic force of the second elastic member, and
movement of the first piston in the second direction causes the second collet member inner peripheral surface portions of the collet members to move toward the first shaft member against the elastic force of the second elastic member.

11. The clamping device as defined in claim 10, wherein:
each of the collet members has a second projection protruding radially outward at the first end part,
the first shaft member has an abutment part configured to be abuttable on the second projections of the collet members, and the clamping device is configured such that:
movement of the first piston in the first direction causes the abutment part of the first movable member to separate from the second projections of the collet members and thereby cause the first collet member inner peripheral surface portions of the collet members to move toward the first shaft member due to the elastic force of the second elastic member, and
movement of the first piston in the second direction causes the abutment part of the first movable member to abut on the second projections of the collet members and thereby apply a force that moves the second projections radially outward and moves the second collet member inner peripheral surface portions of the collet members toward the first shaft member against the elastic force of the second elastic member.

12. The clamping device as defined in claim 11, wherein:
the first shaft member has a projection protruding radially outward at a second end part that is disposed farther from the first chamber than a first end part disposed closest to the first chamber, and
the clamping device is configured such that:
movement of the first piston in the first direction causes the projection of the first shaft member to abut on a portion of the second collet member inner peripheral surface portions of the collet members and thereby apply a force that moves the second collet member inner peripheral surface portions away from the first shaft member, and
movement of the first piston in the second direction causes the projection of the first shaft member to separate from the portion of the second collet member inner peripheral surface portions of the collet members.

13. The clamping device as defined in claim 12, wherein:
the body has a movement restricting part at a prescribed position configured to block the collet members from moving in the second direction,
the clamping mechanism includes a third elastic member, and
the third elastic member generates an elastic force that urges the first piston in the first direction away from the collet members.

14. The clamping device as defined in claim 13, wherein:
the second movable member includes a second piston that defines the volume of the second chamber, and a second shaft member provided on a side of the second piston farthest from the second chamber,
the second shaft member extends along the extending direction of the second body interior space, and
the clamping device is configured such that the second shaft member is movable along the extending direction of the second body interior space in conjunction with rotation of the rotary member.

15. A clamping device configured to clamp a member having a shank part in which a recess is formed, comprising:
a body defining a first body interior space, a second body interior space and a communication passage that fluidly connects the first chamber and the second chamber,
a clamping mechanism having a first movable member that is movable along an extending direction of the first body interior space, a first chamber having a volume that changes in response to movement of the first movable member, a first elastic member that generates an elastic force that urges the first movable member to move relative to the body in a first direction that reduces the volume of the first chamber, and a collet having a first projection that is engageable with the recess of the member to be clamped, and
a driving mechanism having a second movable member that is movable along an extending direction of the second body interior space, and a second chamber having a volume that changes in response to movement of the second movable member,
wherein:
the clamping device is configured such that:
the collet is settable to a clamping mode, in which the first projection is engaged with the recess, by moving the first movable member in the first direction, and
the collet is also settable to an unclamping mode, in which the engagement of the first projection in the recess is released, by moving the first movable member in a second direction that increases the volume of the first chamber,
a power transmitting medium is filled in the first chamber, the second chamber and the communication passage,
the first chamber has a first cross-sectional area that is larger than a second cross-sectional area of the second chamber, and
the clamping device is configured such that:
movement of the second movable member in a third direction that increases the volume of the second chamber causes the first movable member to move in the first direction due to the elastic force of the first elastic member, and thereby causes the collet to be set to the clamping mode, and
movement of the second movable member in a fourth direction that reduces the volume of the second chamber causes the first movable member to move in the second direction against the elastic force of the first elastic member and thereby causes the collet to change to the unclamping mode.

16. The clamping device as defined in claim 15, wherein:
the driving mechanism includes a rotary member,
the second movable member is configured to be movable along the extending direction of the second body interior space in conjunction with rotation of the rotary member, and
the driving mechanism is configured such that:
rotation of the rotary member in one direction causes the second movable member to move in the third direction, and
rotation of the rotary member in an opposite direction causes the second movable member to move in the fourth direction.

17. The clamping device as defined in claim 15, wherein:
the shank part of the member to be clamped has a shank part inner peripheral surface that defines a shank part interior space having an opening at one end,
the recess is formed in the shank part inner peripheral surface,
the first movable member includes a first piston that defines the volume of the first chamber, and a first shaft member provided on a side of the first piston that is farthest from the first chamber, the first shaft member extending along the extending direction of the first body interior space,
the collet comprises a plurality of collet members circumferentially disposed around the first shaft member,
each of the collet members has a collet member inner peripheral surface, a collet member outer peripheral surface, and the first projection that protrudes radially outward from a second end part of the collet member that is disposed on a second side that farther from the first chamber than a first end part of the collet member that is disposed on a first side closest to the first chamber, each of the collet member inner peripheral surfaces has, when viewed in cross-section taken along the extending direction of the first shaft member, a first collet member inner peripheral surface portion, and a second collet member inner peripheral surface portion that is formed on a side of the first collet member inner peripheral surface portion adjacent to the second end part and extends at an inclination angle θ to an extending direction of the first collet member inner peripheral surface portion, the inclination angle θ is set such that the distance between an extension line of the first collet member inner peripheral surface portion and the second collet member inner peripheral surface portion increases from the first side in a direction toward the second side, and the clamping mechanism is configured such that:

movement of the first piston in the first direction causes the first collet member inner peripheral surface portions of the collet members to move toward the first shaft member and thereby causes the collet to be set to the clamping mode, and movement of the first piston in the second direction causes the second collet member inner peripheral surface portions of the collet members to move toward the first shaft member and thereby causes the collet to be changed to the unclamping mode.

18. The clamping device as defined in claim 17, wherein:

the clamping mechanism further includes a second elastic member, the second elastic member generates an elastic force that urges the first collet member inner peripheral surface portions of the collet members to move toward the first shaft member, and the clamping mechanism is configured such that:

movement of the first piston in the first direction causes the first collet member inner peripheral surface portions of the collet members to move toward the first shaft member due to the elastic force of the second elastic member, and movement of the first piston in the second direction causes the second collet member inner peripheral surface portions of the collet members to move toward the first shaft member against the elastic force of the second elastic member.

19. The clamping device as defined in claim 17, wherein:

each of the collet members has a second projection protruding radially outward at the first end part, the first shaft member has an abutment part configured to be abuttable on the second projections of the collet members, and the clamping mechanism is configured such that:

movement of the first piston in the first direction causes the abutment part of the first movable member to separate from the second projections of the collet members and thereby cause the first collet member inner peripheral surface portions of the collet members to move toward the first shaft member due to the elastic force of the second elastic member, and movement of the first piston in the second direction causes the abutment part of the first movable member to abut on the second projections of the collet members and thereby apply a force that moves the second projections radially outward and moves the second collet member inner peripheral surface portions of the collet members toward the first shaft member against the elastic force of the second elastic member.

20. The clamping device as defined in claim 17, wherein:

the first shaft member has a projection protruding radially outward at a second end part that is disposed farther from the first chamber than a first end part disposed closest to the first chamber, and the clamping mechanism is configured such that:

movement of the first piston in the first direction causes the projection of the first shaft member to abut on the second collet member inner peripheral surface portions of the collet members and thereby apply a force that moves the second collet member inner peripheral surface portions away from the first shaft member, and movement of the first piston in the second direction causes the projection of the first shaft member to separate from the second collet member inner peripheral surface portions of the collet members.

* * * * *